United States Patent
Tyagi

(10) Patent No.: US 12,429,627 B2
(45) Date of Patent: *Sep. 30, 2025

(54) SURFACE MODIFICATION CONTROL STATIONS AND METHODS IN A GLOBALLY DISTRIBUTED ARRAY FOR DYNAMICALLY ADJUSTING THE ATMOSPHERIC, TERRESTRIAL AND OCEANIC PROPERTIES

(71) Applicant: Sunit Tyagi, Bangalore (IN)

(72) Inventor: Sunit Tyagi, Bangalore (IN)

( * ) Notice: Subject to any disclaimer, the term of this patent is extended or adjusted under 35 U.S.C. 154(b) by 0 days.

This patent is subject to a terminal disclaimer.

(21) Appl. No.: 18/296,230

(22) Filed: Apr. 5, 2023

(65) Prior Publication Data

US 2023/0314655 A1 Oct. 5, 2023

Related U.S. Application Data

(63) Continuation of application No. 16/409,055, filed on May 10, 2019, now Pat. No. 11,762,126, which is a
(Continued)

(51) Int. Cl.
*A01G 15/00* (2006.01)
*E02B 1/00* (2006.01)
(Continued)

(52) U.S. Cl.
CPC .............. *G01W 1/06* (2013.01); *E02B 1/003* (2013.01); *F03B 17/061* (2013.01); *F03D 9/00* (2013.01);
(Continued)

(58) Field of Classification Search
CPC .......................... A01G 15/00; G01W 2201/00
See application file for complete search history.

(56) References Cited

U.S. PATENT DOCUMENTS 8,820,651 B2   9/2014 Futaeda et al.
11,762,126 B2 * 9/2023 Tyagi .................... F03B 17/061
                                                          405/80
(Continued)

FOREIGN PATENT DOCUMENTS

ES    2 211 338 A1   4/2004

OTHER PUBLICATIONS

International Search Report of PCT/IB2018/051811 dated Aug. 6, 2018.
(Continued)

*Primary Examiner* — Sunil Singh
(74) *Attorney, Agent, or Firm* — Sughrue Mion, PLLC

(57) ABSTRACT

Surface modification control stations and methods in a globally distributed array for dynamically adjusting the atmospheric, terrestrial and oceanic properties. The control stations modify the humidity, currents, wind flows and heat removal rate of the surface and facilitate cooling and control of large area of global surface temperatures. This global system is made of arrays of multiple sub-systems that monitor climate and act locally on weather with dynamically generated local forcing & perturbations for guiding in a controlled manner aim at long-term modifications. The machineries are part of a large-scale system consisting of an array of many such machines put across the globe at locations called the control stations. These are then used in a coordinated manner to modify large area weather and the global climate as desired. The energy system installed at a control stations, with multiple machines to change the local parameters of the ocean, these stations are powered using renewable energy (RE) sources including Solar, Ocean Currents, Wind, Waves and Batteries to store energy and provide sufficient power and energy as required and available at all hours. This energy is then used to do directed work using
(Continued)

special machines, that can be pumps for seawater to move ocean water either amplifying or changing the currents in various locations and at different depths, in addition it will have machineries for changing the vertical depth profile of the ocean of temperature, salinity and currents. Control stations will also directly use devices such as heat pumps to change the temperatures of local water either at surface or at controlled depths, or modify the humidity and salinity to change the atmospheric and oceanic properties as desired. The system will work in a globally coordinated manner applying artificial intelligence and machine learning algorithms to learn from observations to improve the control characteristics and aim to slow down the rise of global surface temperatures. These systems are used to reduce the temperatures of coral reefs, arctic glaciers and south pacific to control the El Nino oscillations.

1 Claim, 27 Drawing Sheets

Related U.S. Application Data continuation of application No. PCT/IB2018/051811, filed on Mar. 19, 2018.

(60) Provisional application No. 62/473,499, filed on Mar. 20, 2017.

(51) Int. Cl.
| | | |
|---|---|---|
| *F03B 17/06* | (2006.01) | |
| *F03D 9/00* | (2016.01) | |
| *F03D 9/30* | (2016.01) | |
| *F03G 7/05* | (2006.01) | |
| *G01W 1/06* | (2006.01) | |
| *G01W 1/17* | (2006.01) | |
| *G06N 7/01* | (2023.01) | |
| *F03D 9/11* | (2016.01) | |

(52) U.S. Cl.
CPC ............... *F03D 9/30* (2016.05); *F03G 7/05* (2013.01); *G01W 1/17* (2013.01); *G06N 7/01* (2023.01); *A01G 15/00* (2013.01); *F03D 9/008* (2013.01); *F03D 9/11* (2016.05); *F05B 2220/62* (2013.01); *F05B 2220/708* (2013.01); *F05B 2240/93* (2013.01); *G01W 2201/00* (2013.01); *G01W 2203/00* (2013.01); *Y02E 10/30* (2013.01)

(56) References Cited

U.S. PATENT DOCUMENTS

| | | |
|---|---|---|
| 2002/0009338 A1 | 1/2002 | Blum et al. |
| 2007/0084768 A1 | 4/2007 | Barber |
| 2008/0047480 A1 | 2/2008 | Sandler |
| 2010/0251789 A1 | 10/2010 | Baird |
| 2010/0300560 A1 | 12/2010 | Bowers et al. |
| 2012/0006908 A1 | 1/2012 | Orridge |
| 2012/0024972 A1 | 2/2012 | Ellis |
| 2014/0224894 A1 | 8/2014 | MacDonald |
| 2017/0217587 A1 | 8/2017 | Goelet |

OTHER PUBLICATIONS

Written Opinion of the International Searching Authority of PCT/IB2018/051811 dated Aug. 6, 2018.

* cited by examiner

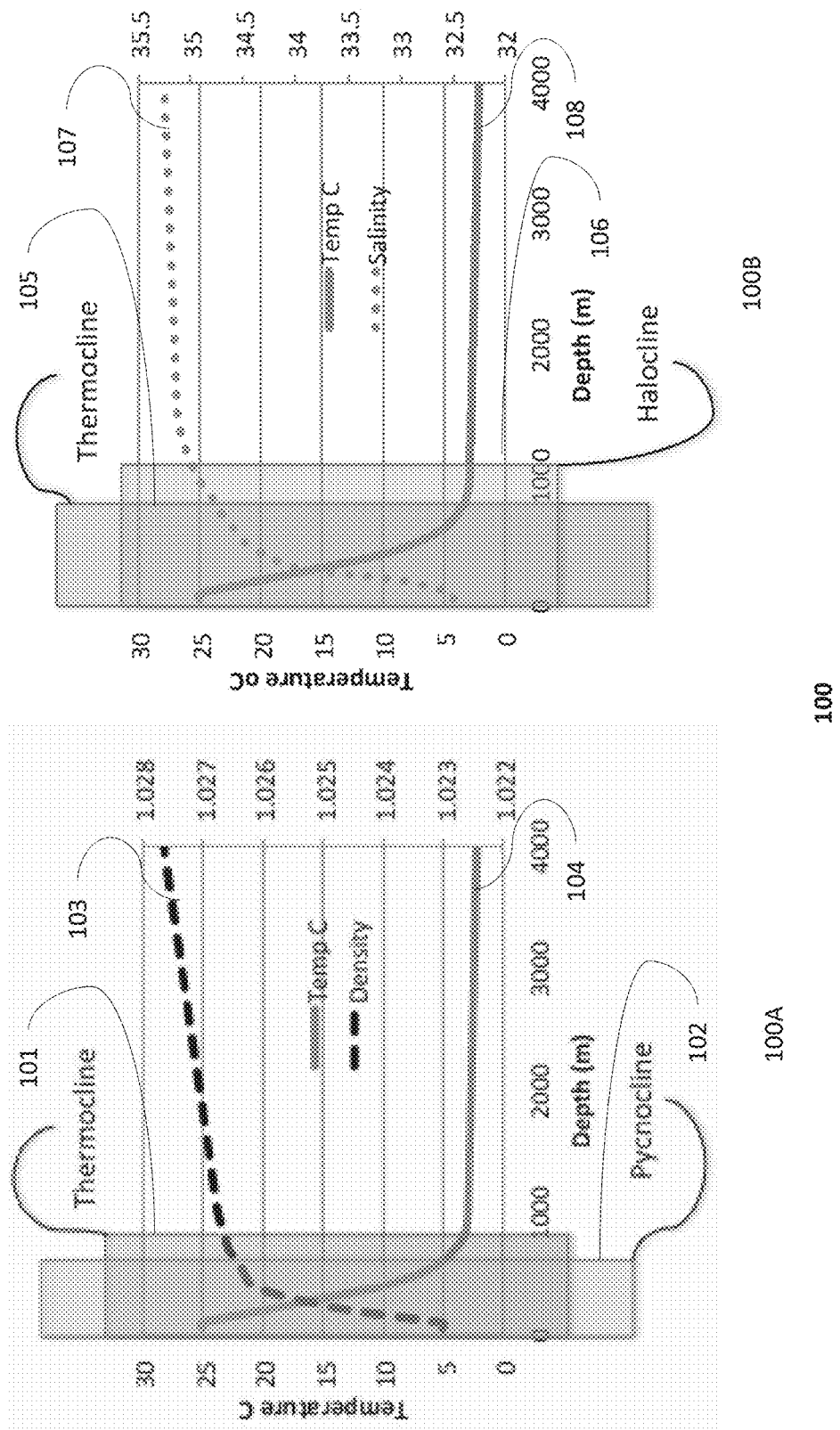
Fig. 1 Ocean Depth Profiles: Thermocline, Halocline and Pycnocline

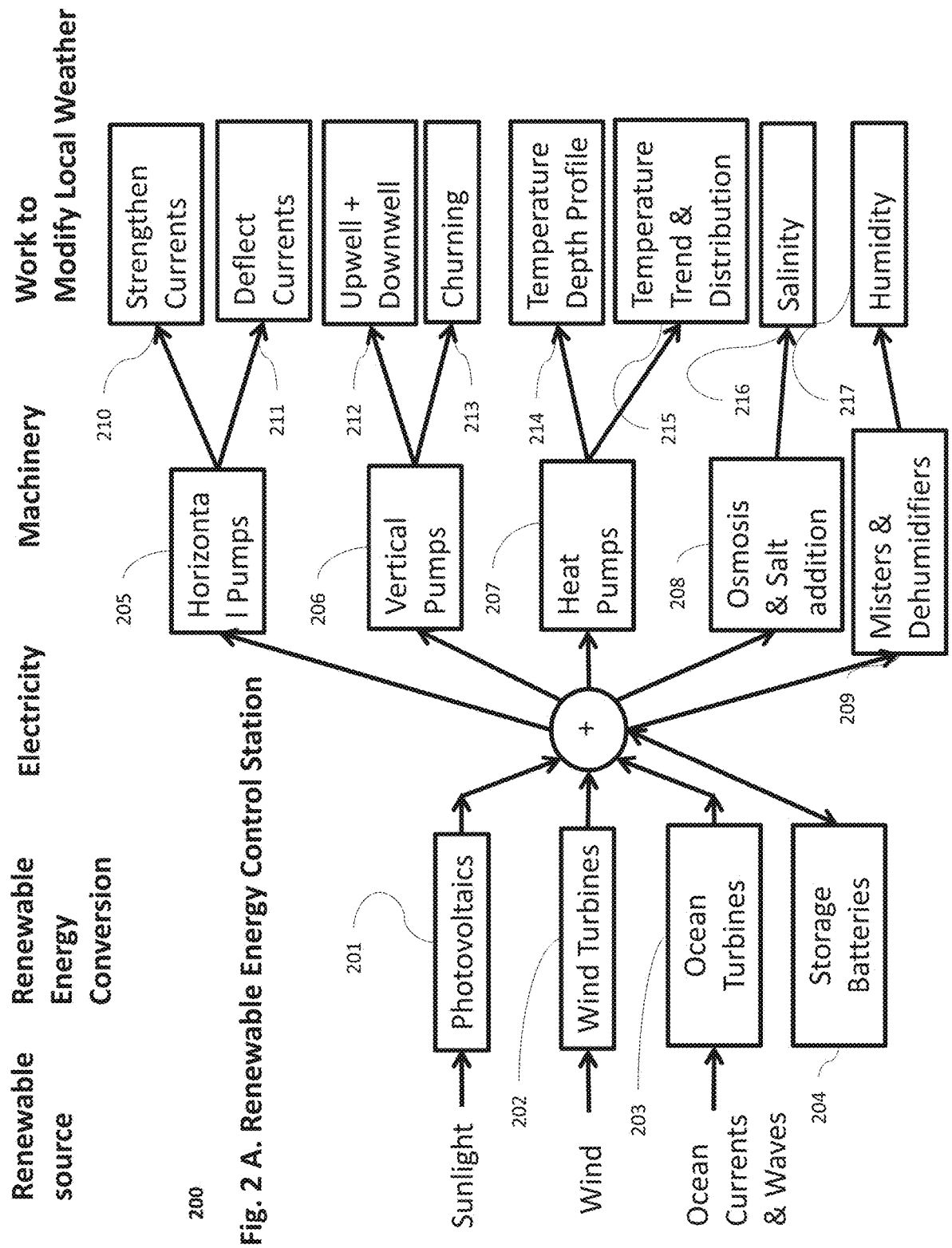
Fig. 2 A. Renewable Energy Control Station

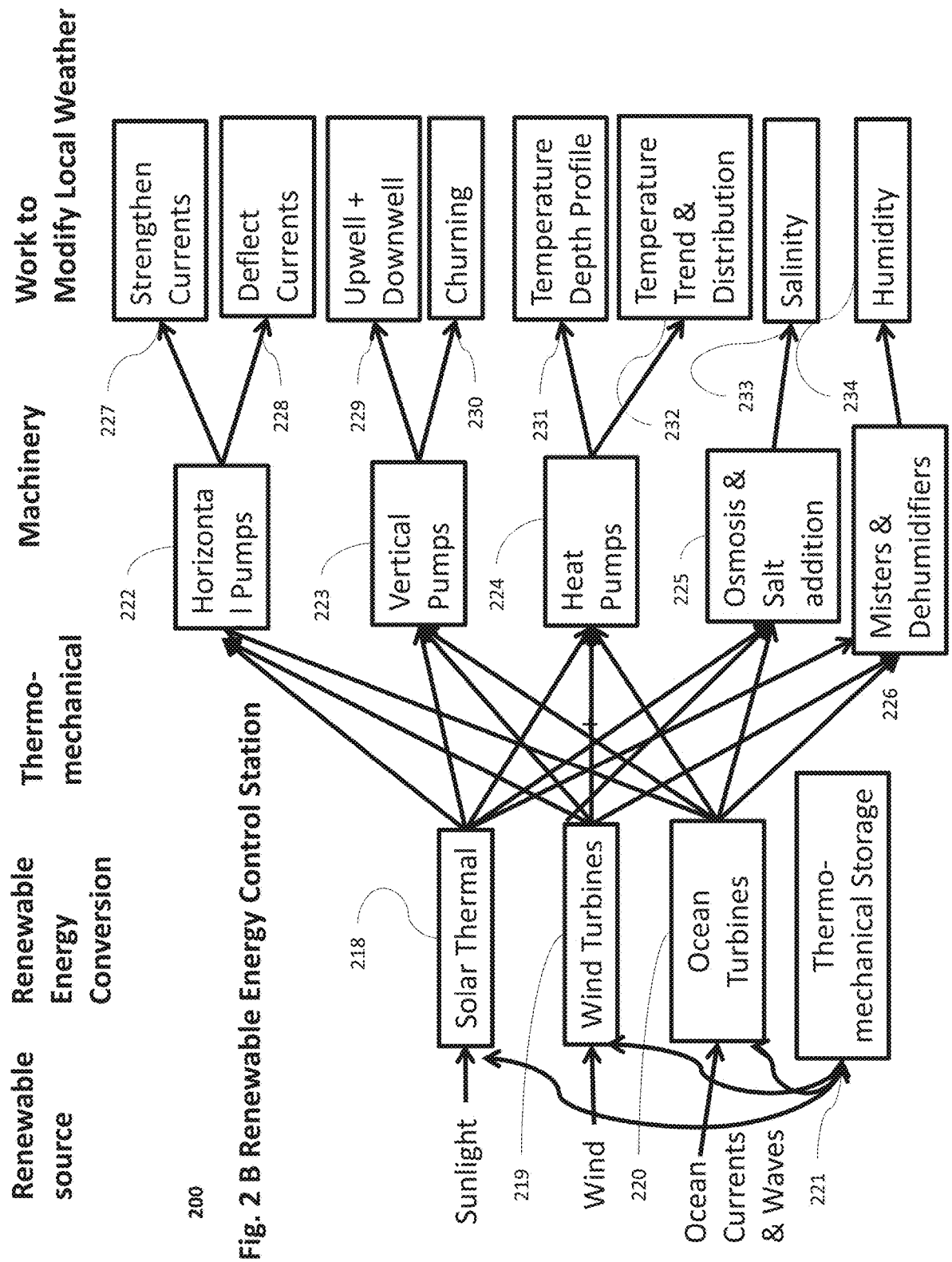
Fig. 2 B Renewable Energy Control Station

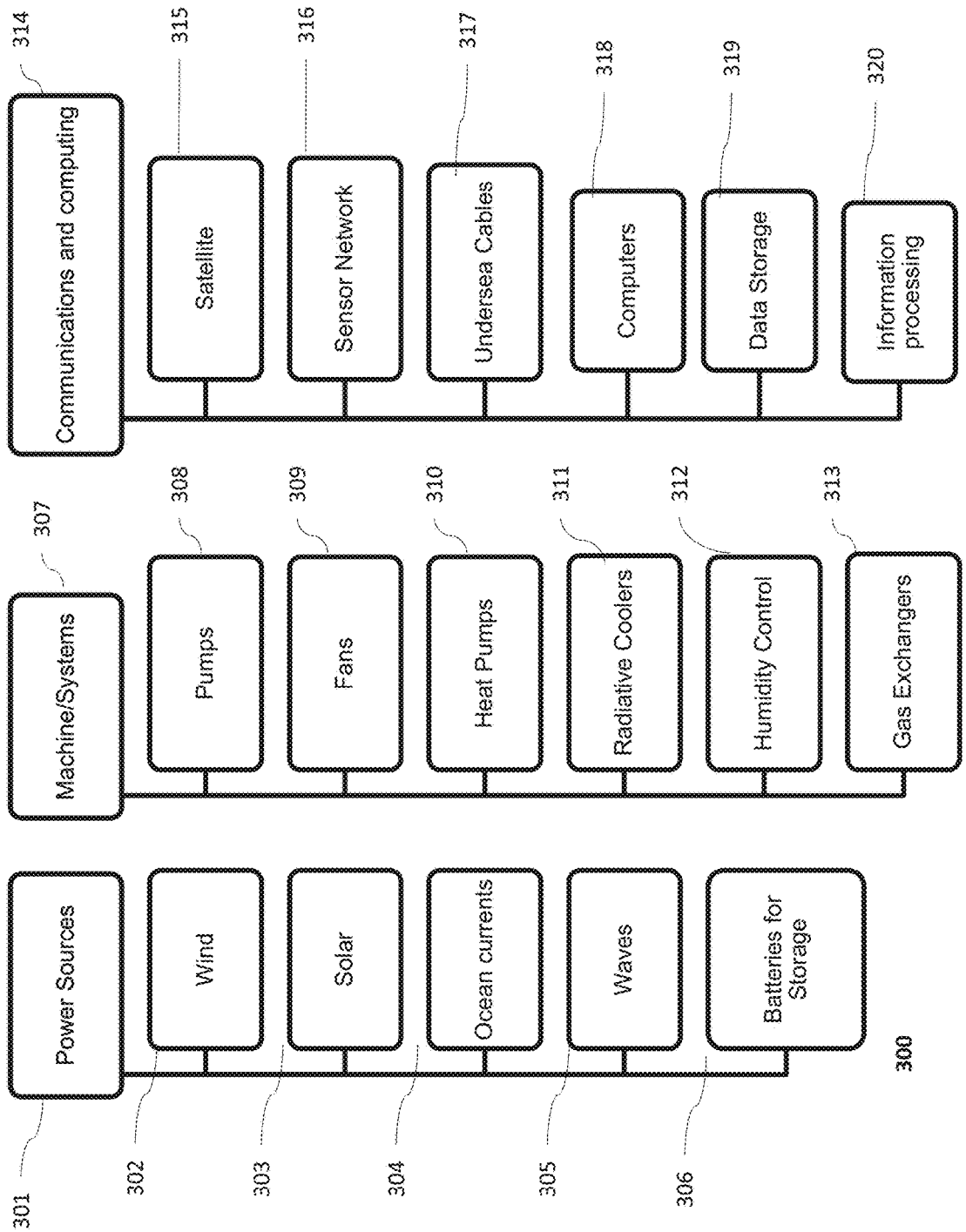
Fig.3 Renewable Energy Control Stations: Combination of Solar, Wind, Ocean and Waves

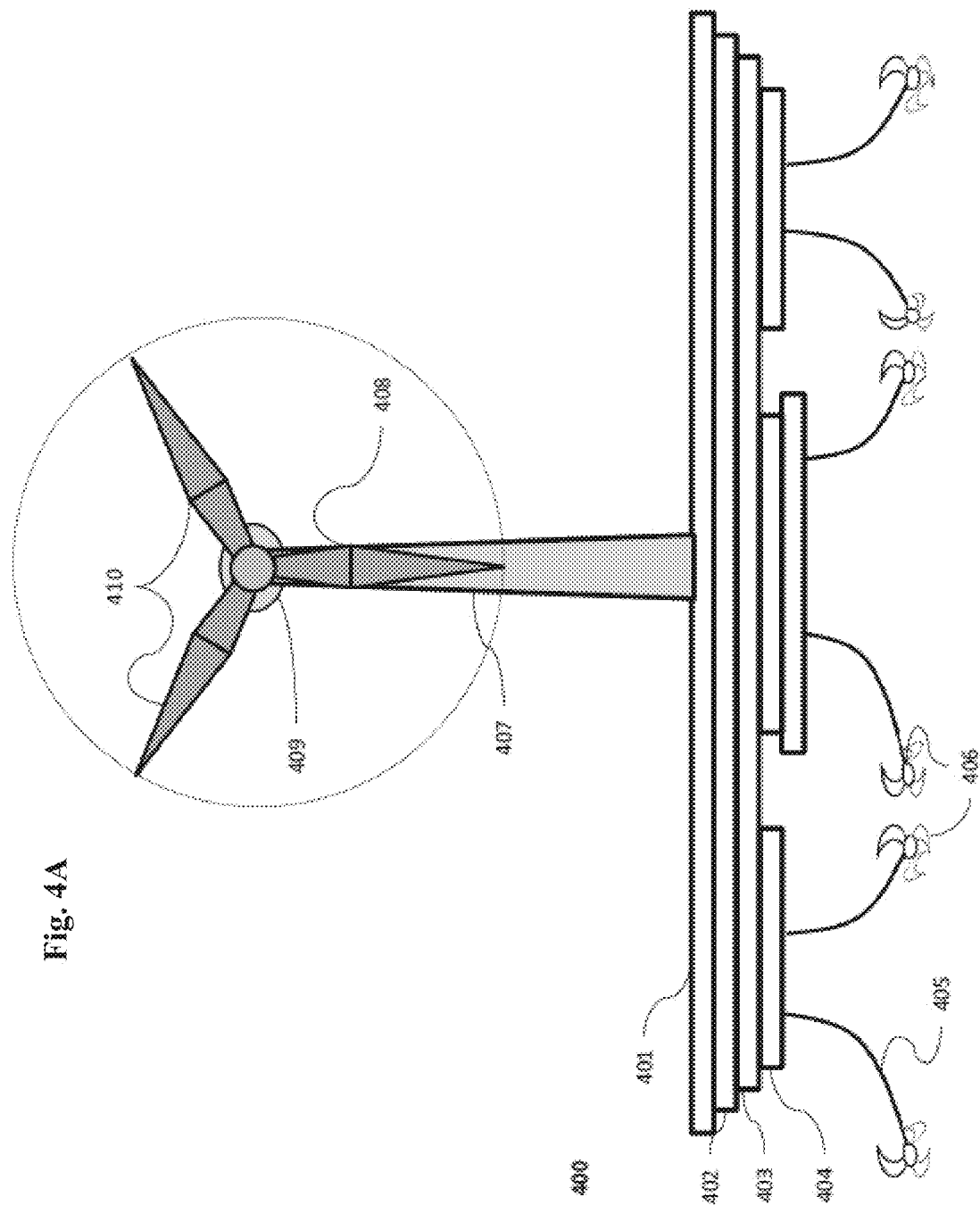

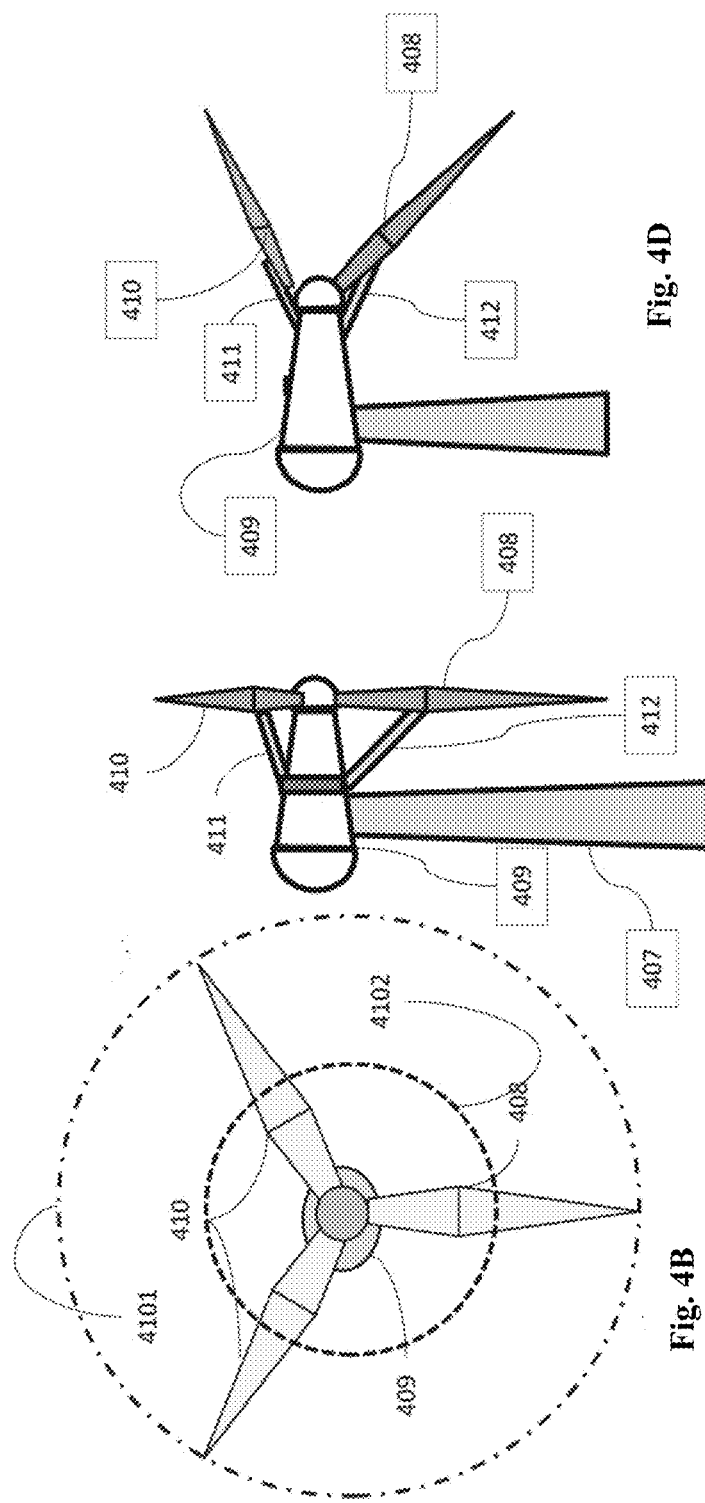
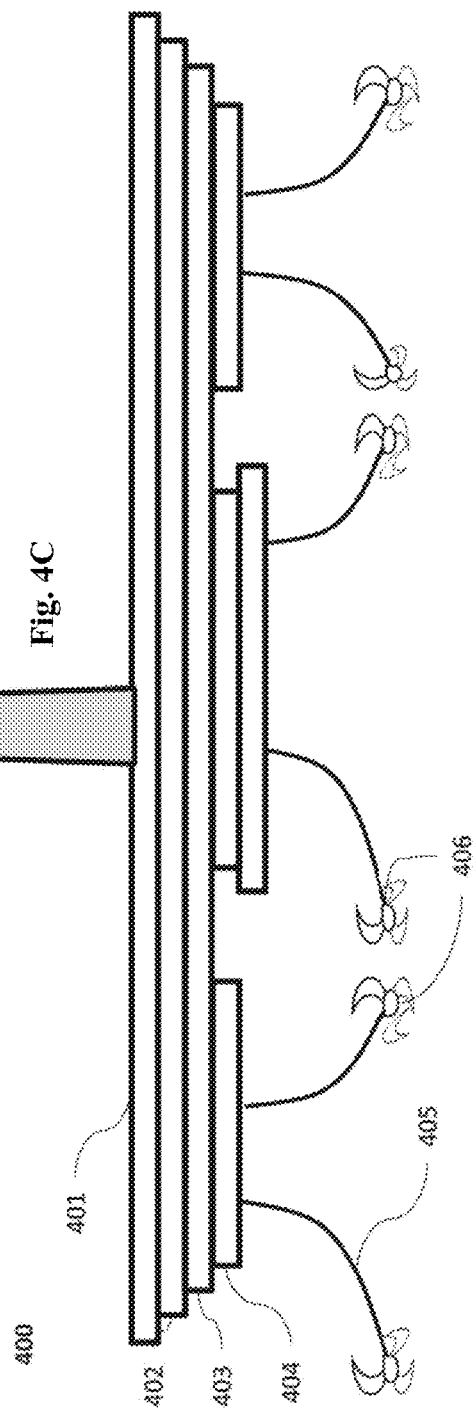
Fig. 4B
Fig. 4C
Fig. 4D

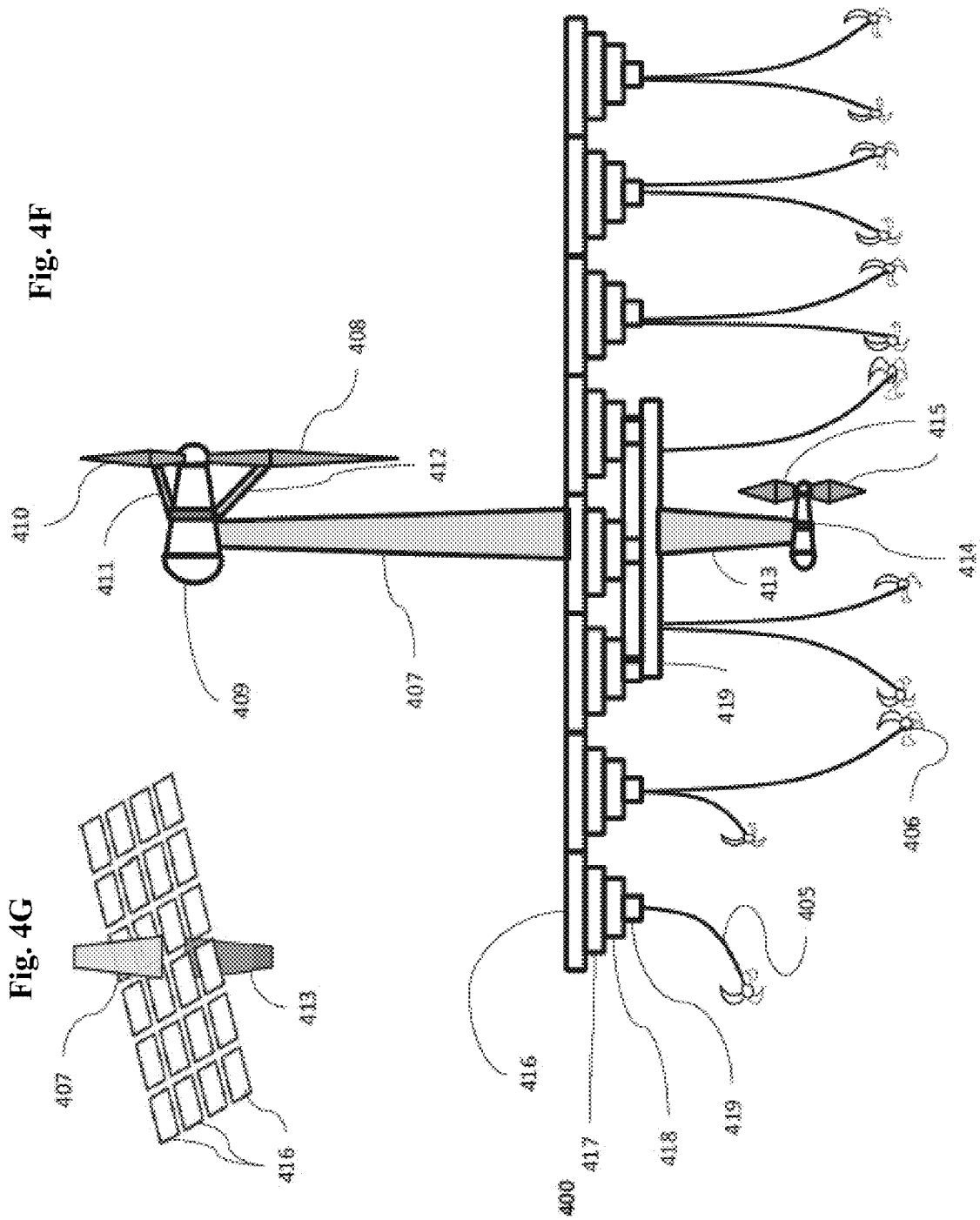

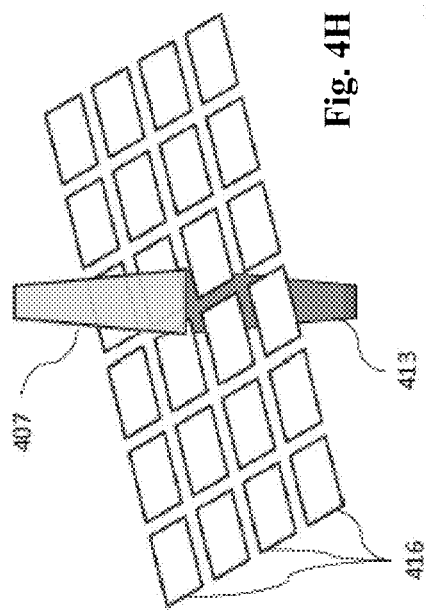
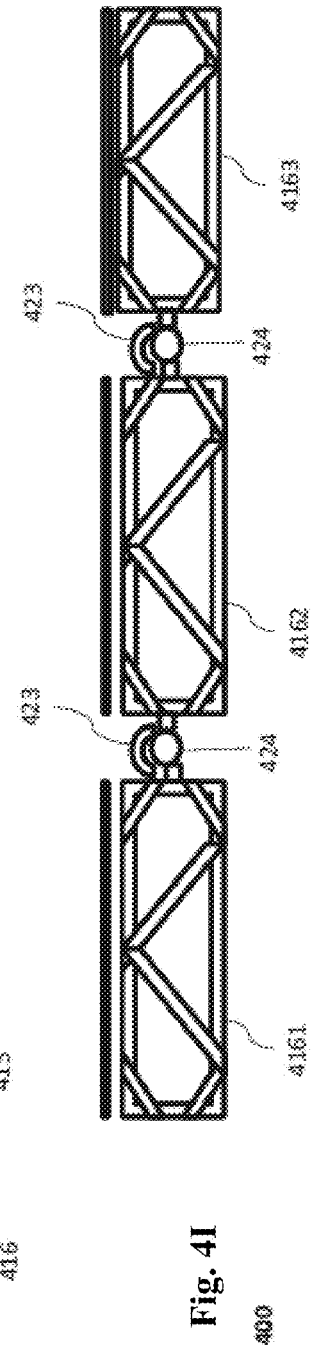
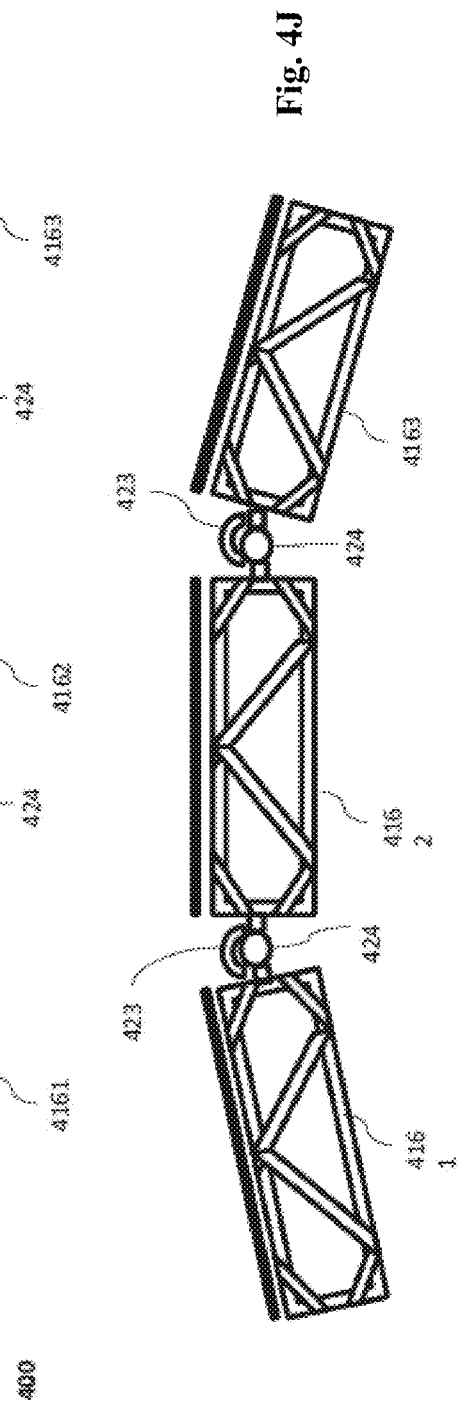
Fig. 4H
Fig. 4I
Fig. 4J

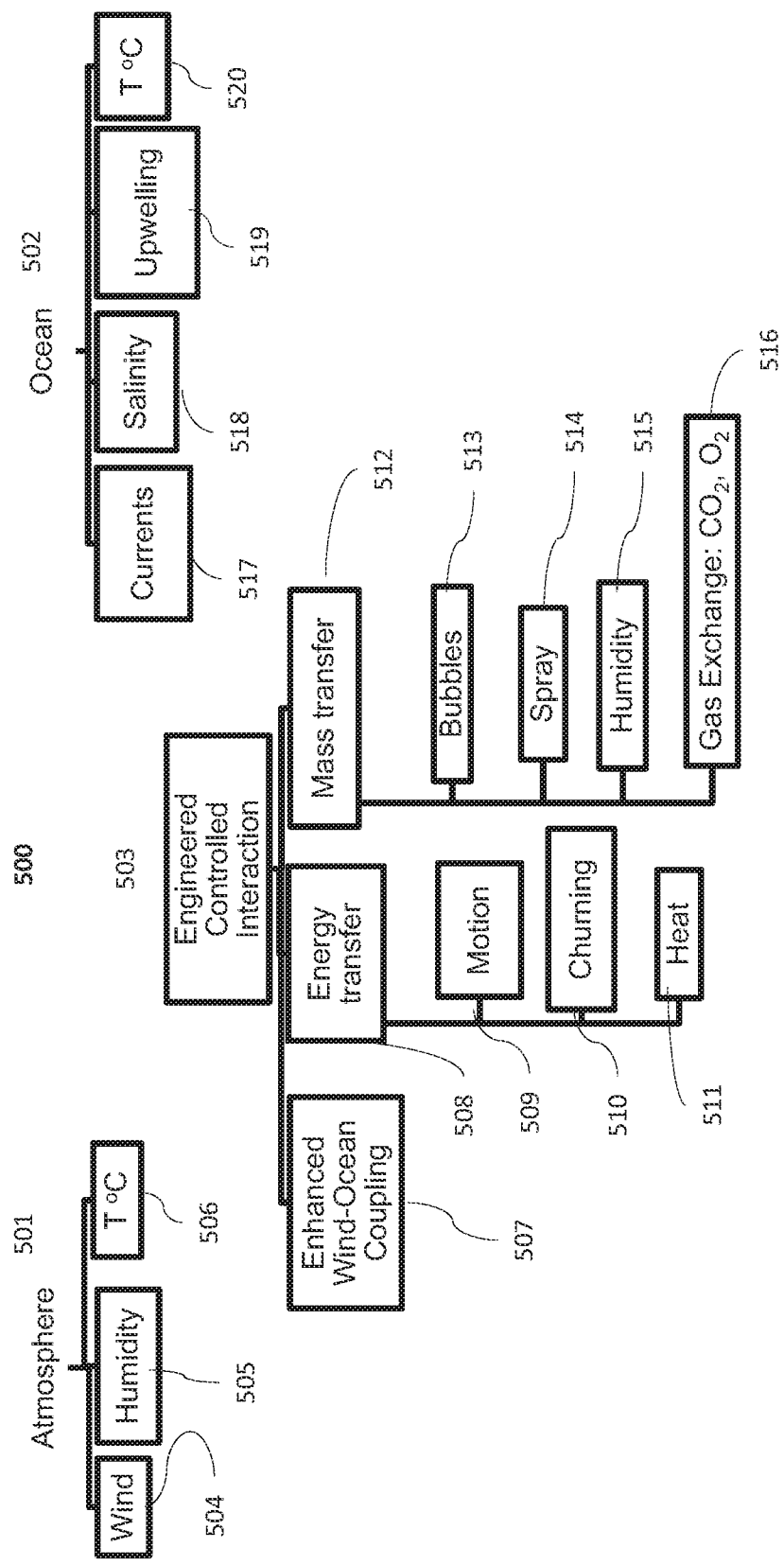
Fig. 5. Engineered Interaction and Controlled Perturbation

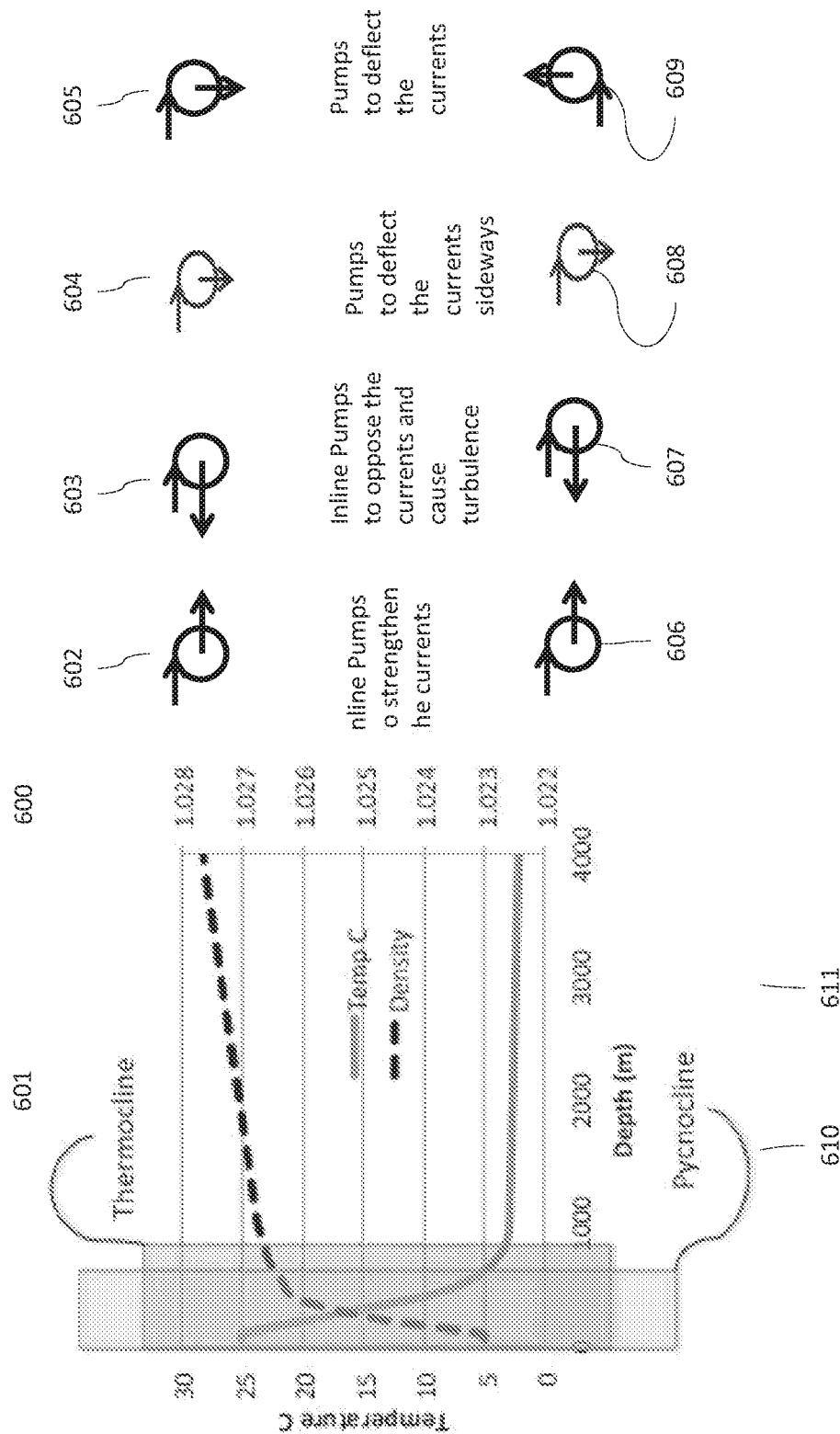
Fig. 6 Pump at different depths and with directions

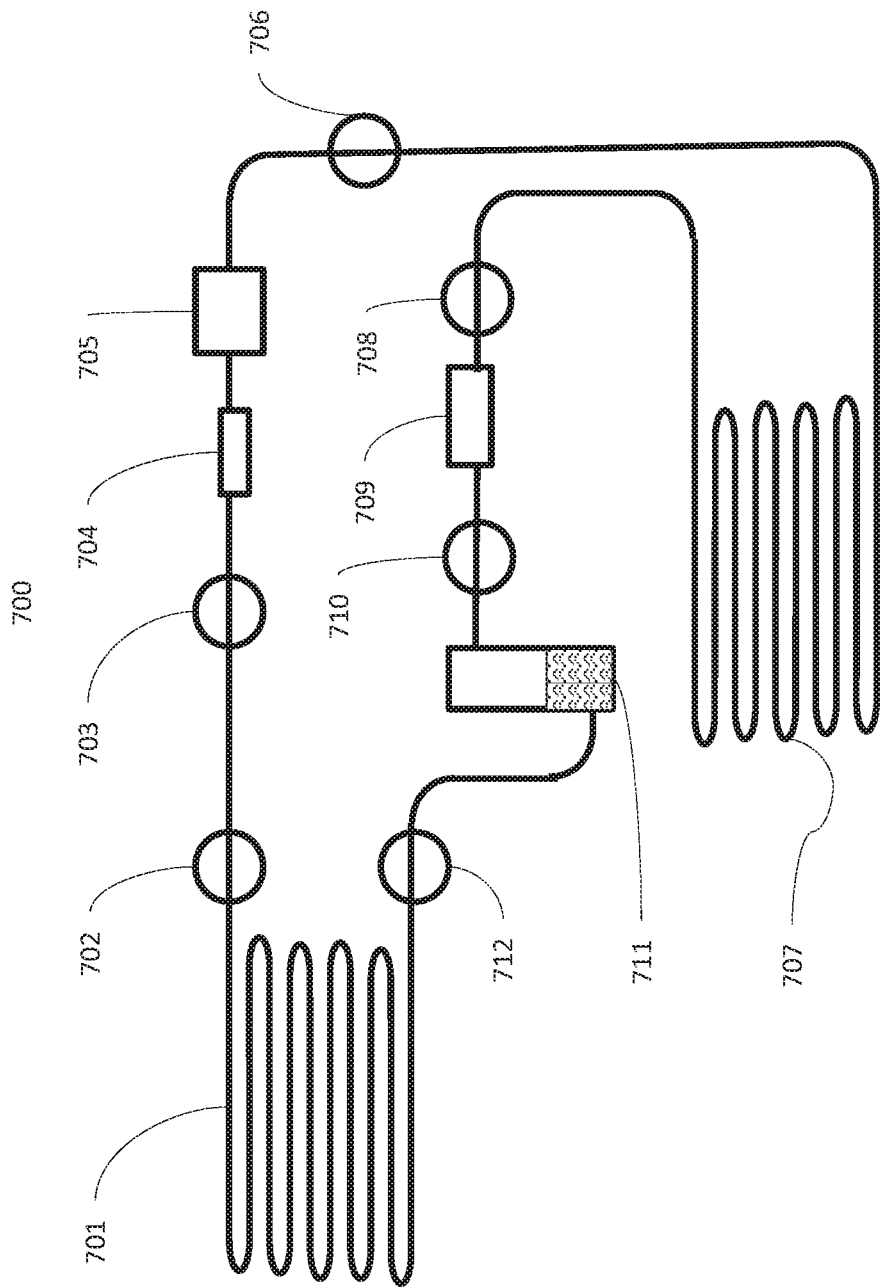
Fig. 7. Design of Heat pump to move heat deeper into Ocean

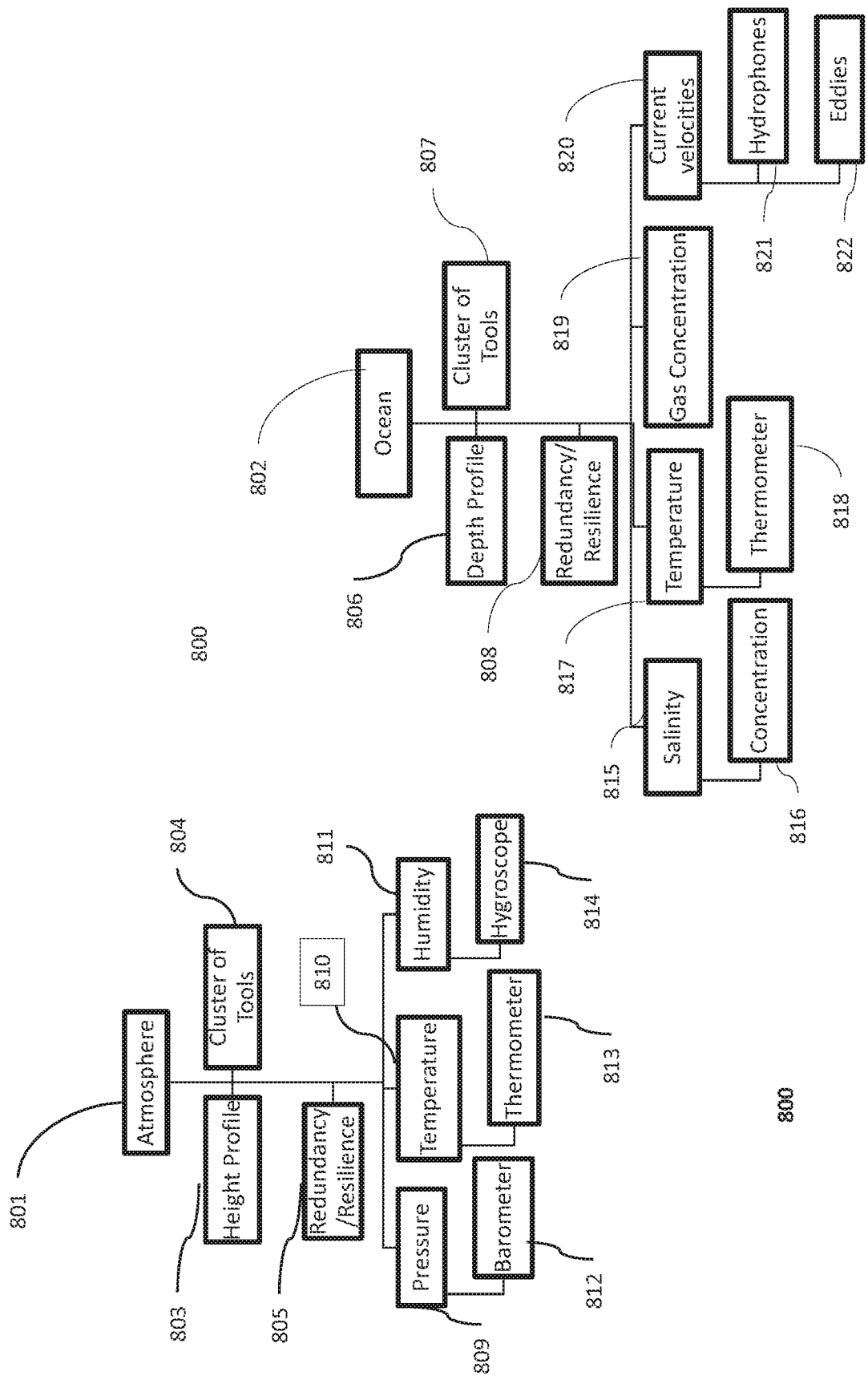
Fig. 8 Sensor Network: Measure, collect, validate and collate data

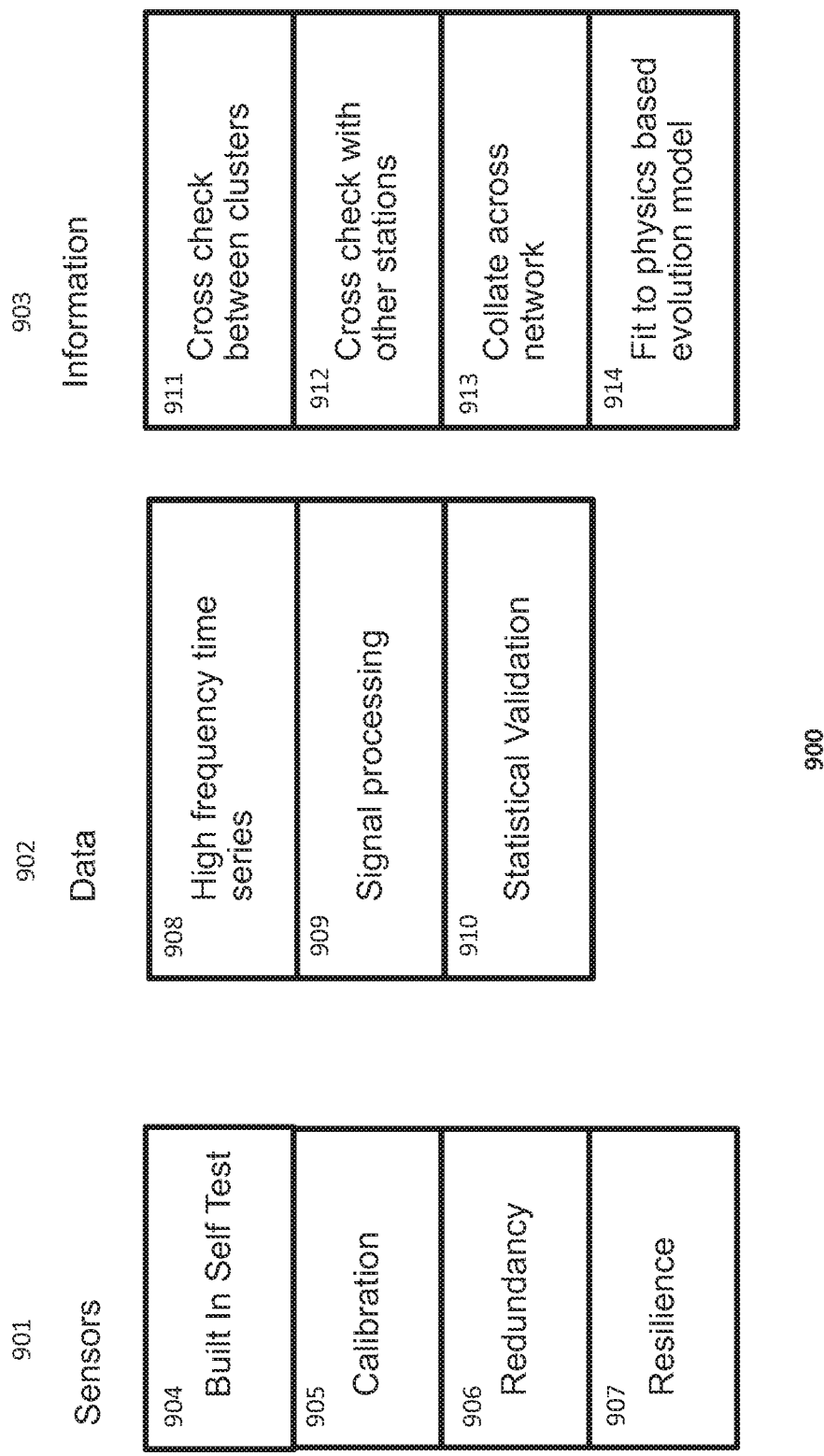
Fig. 9 Distributed database with Edge computation for cross-check, collating and validation Fig. 10. Array Ensemble Forcing
Designed Array for ensemble driven modification

| | 1001 | 1002 | 1003 | 1004 | 1005 | 1006 | 1007 | 1008 | 1009 | 1010 | 1011 | 1012 |
|---|---|---|---|---|---|---|---|---|---|---|---|---|
| 1014 | X (1013) | | O | O | O | O | O | O | O | O | O | O |
| 1015 | | X | | O | O | O | O | O | O | O | O | |
| 1016 | X | | X | | O | O | O | O | O | O | O | O |
| 1017 | | X | X | X | | X | X | X | X | X | X | |
| 1018 | X | | X | X | X | | X | X | X | X | | X |
| 1019 | | X | X | X | | X | X | X | X | | X | |
| 1020 | X | | X | X | X | | X | X | X | X | | X |
| 1021 | | X | | X | | O | | O | | O | O | |

1000

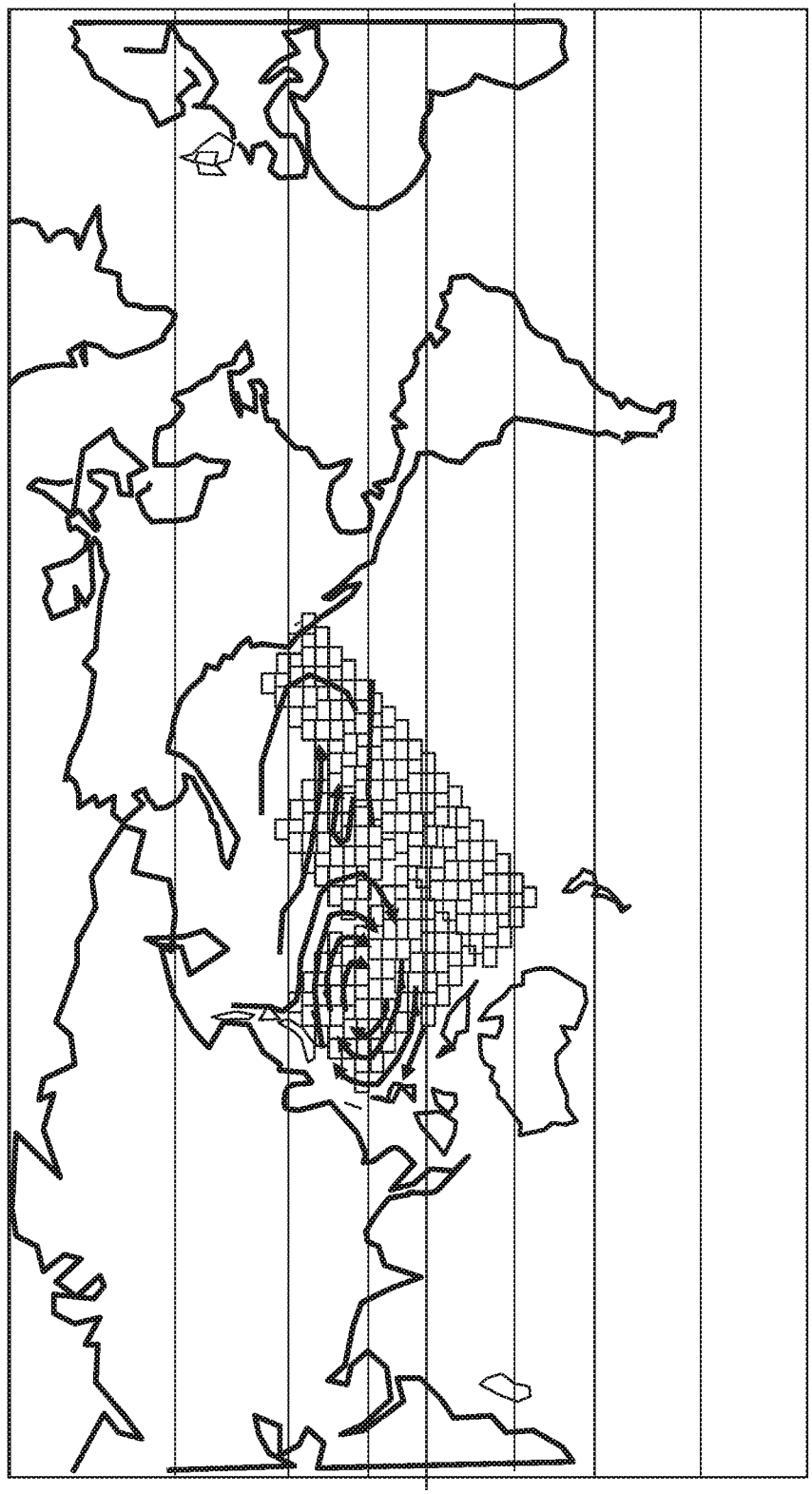
Fig. 11 Regular Grid of Control Stations placed in open Ocean

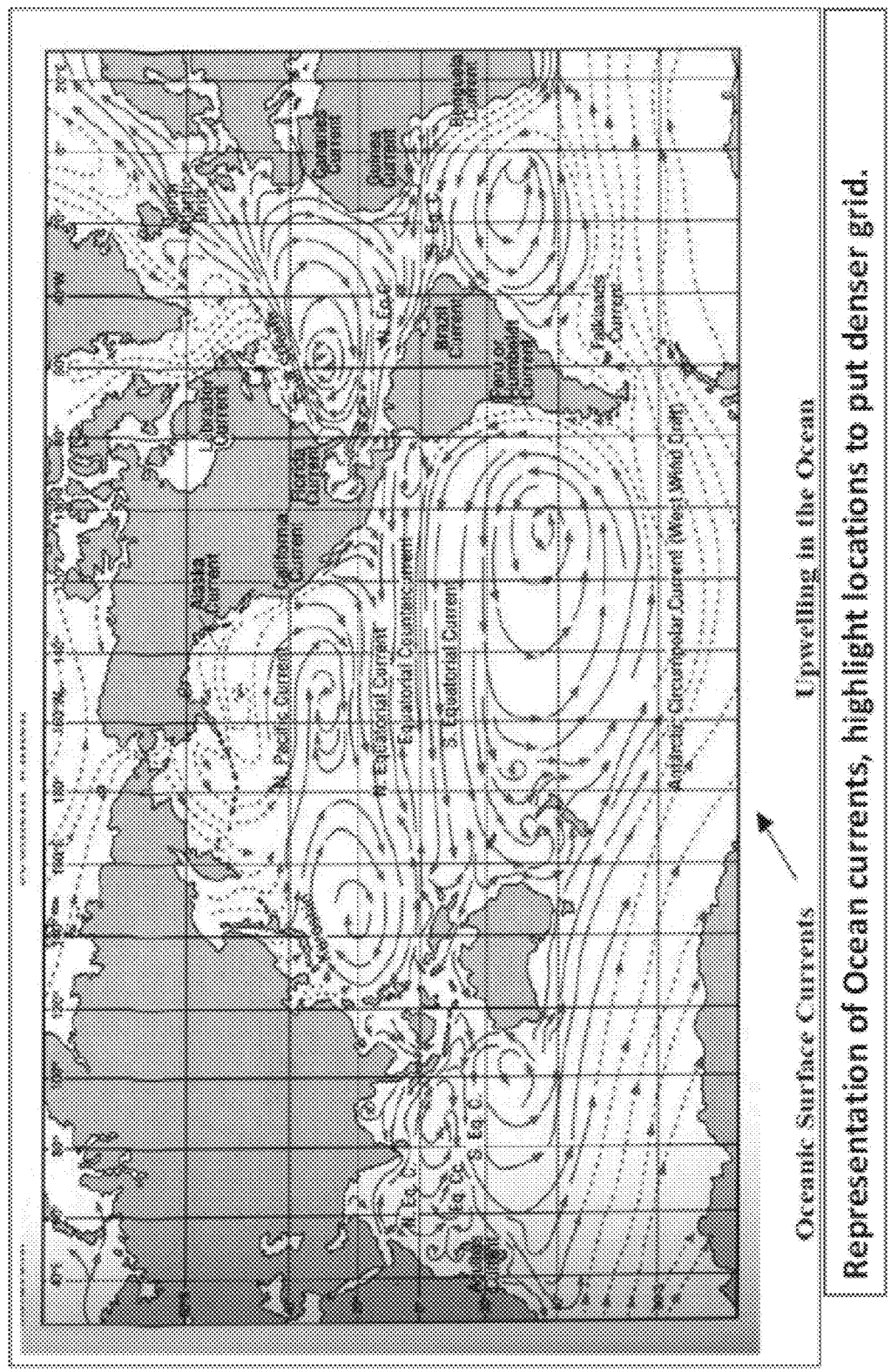
Fig. 12A Geographical Placement and Grids

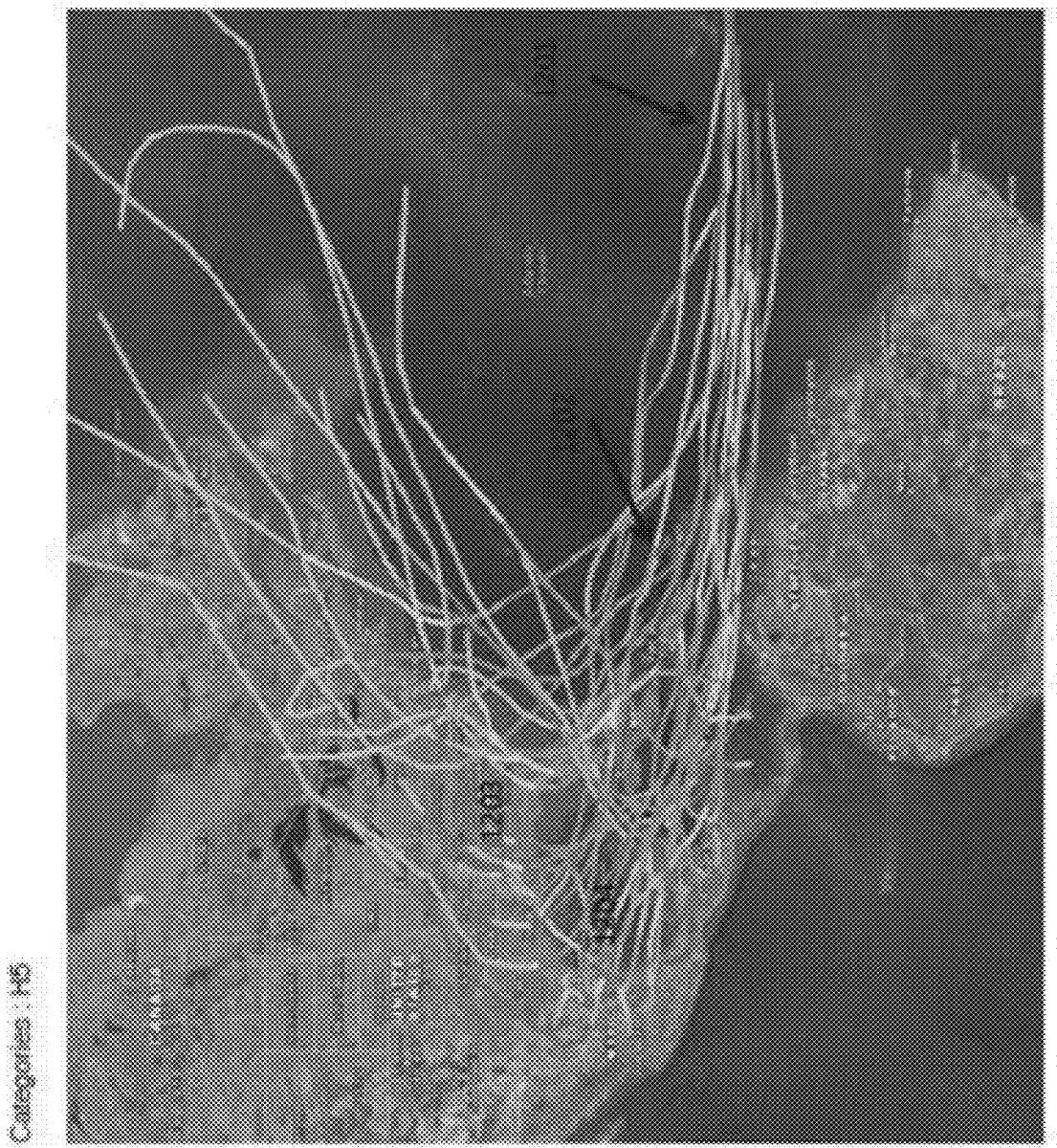
Fig. 12B Paths for Category 5 Atlantic Hurricanes

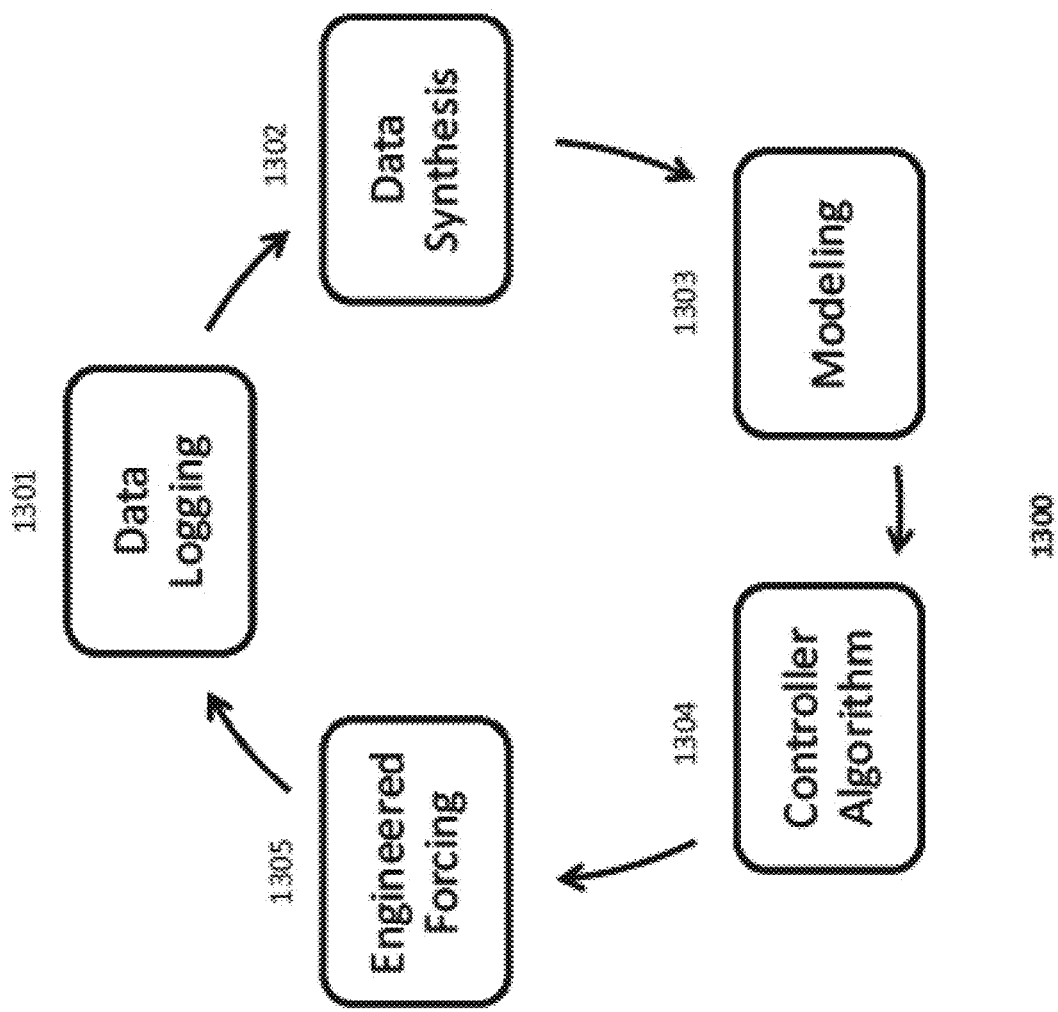
Fig. 13A The complete learning cycle

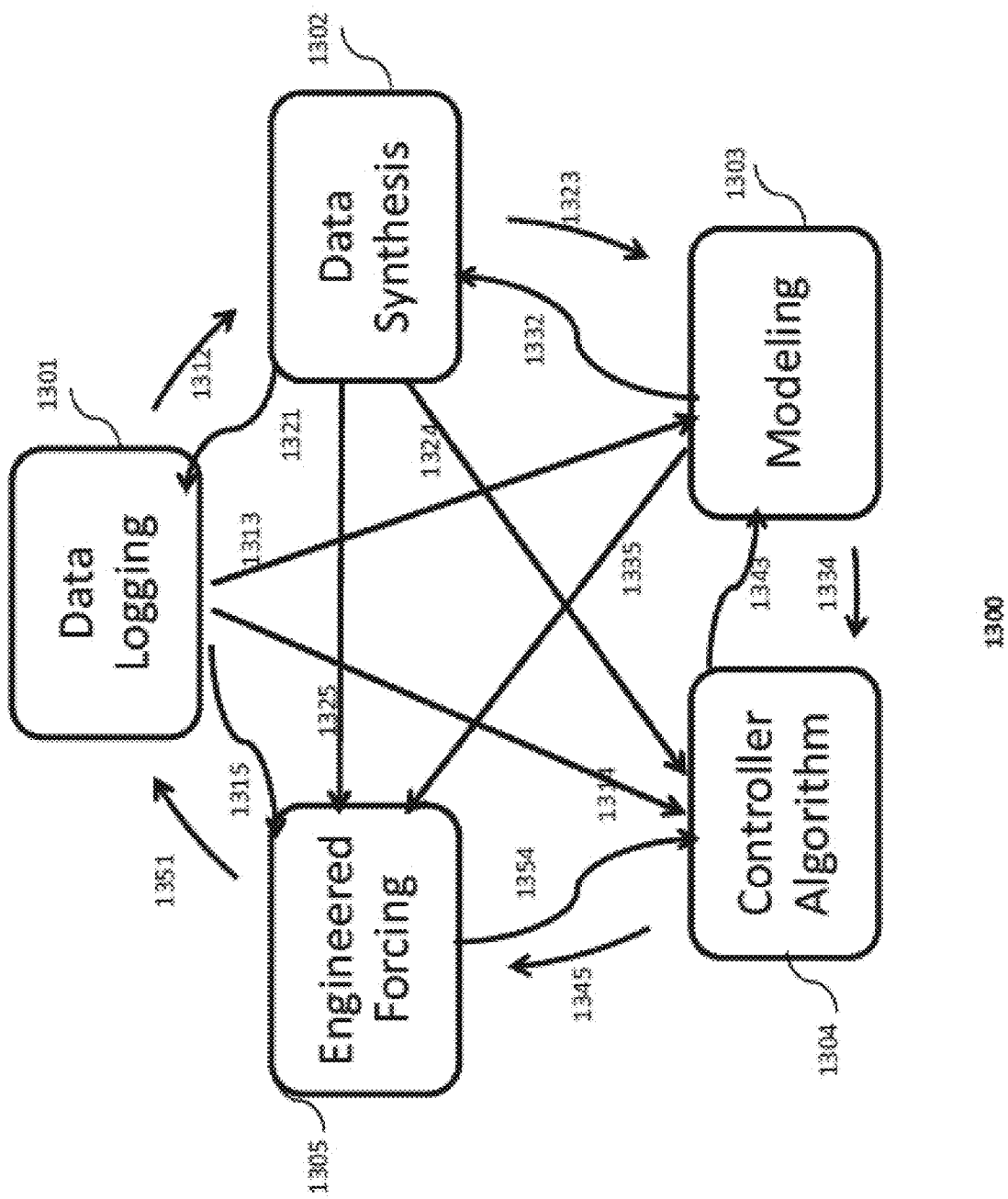
Fig. 13C Interconnected learning

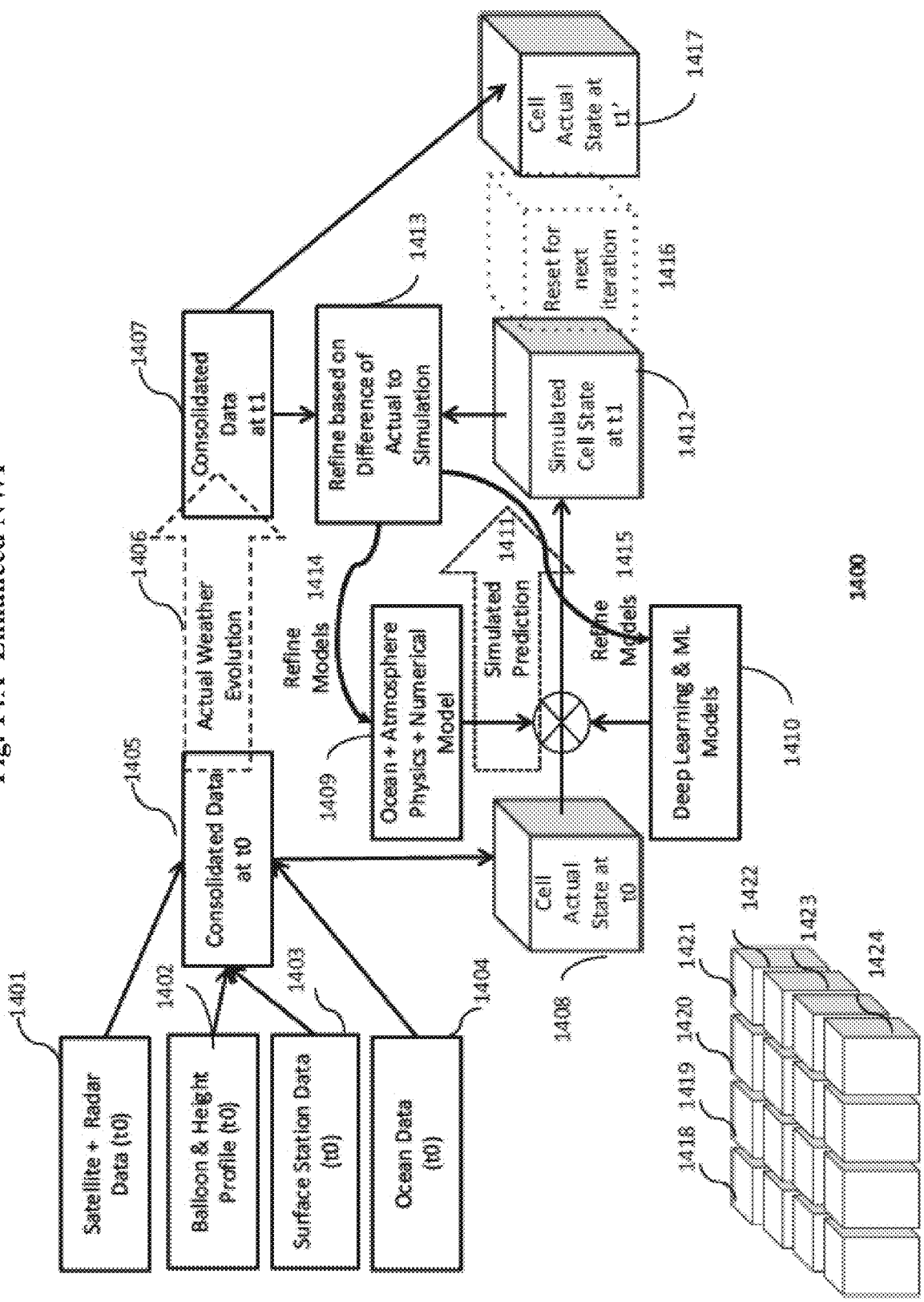
Fig. 14A Enhanced NWP

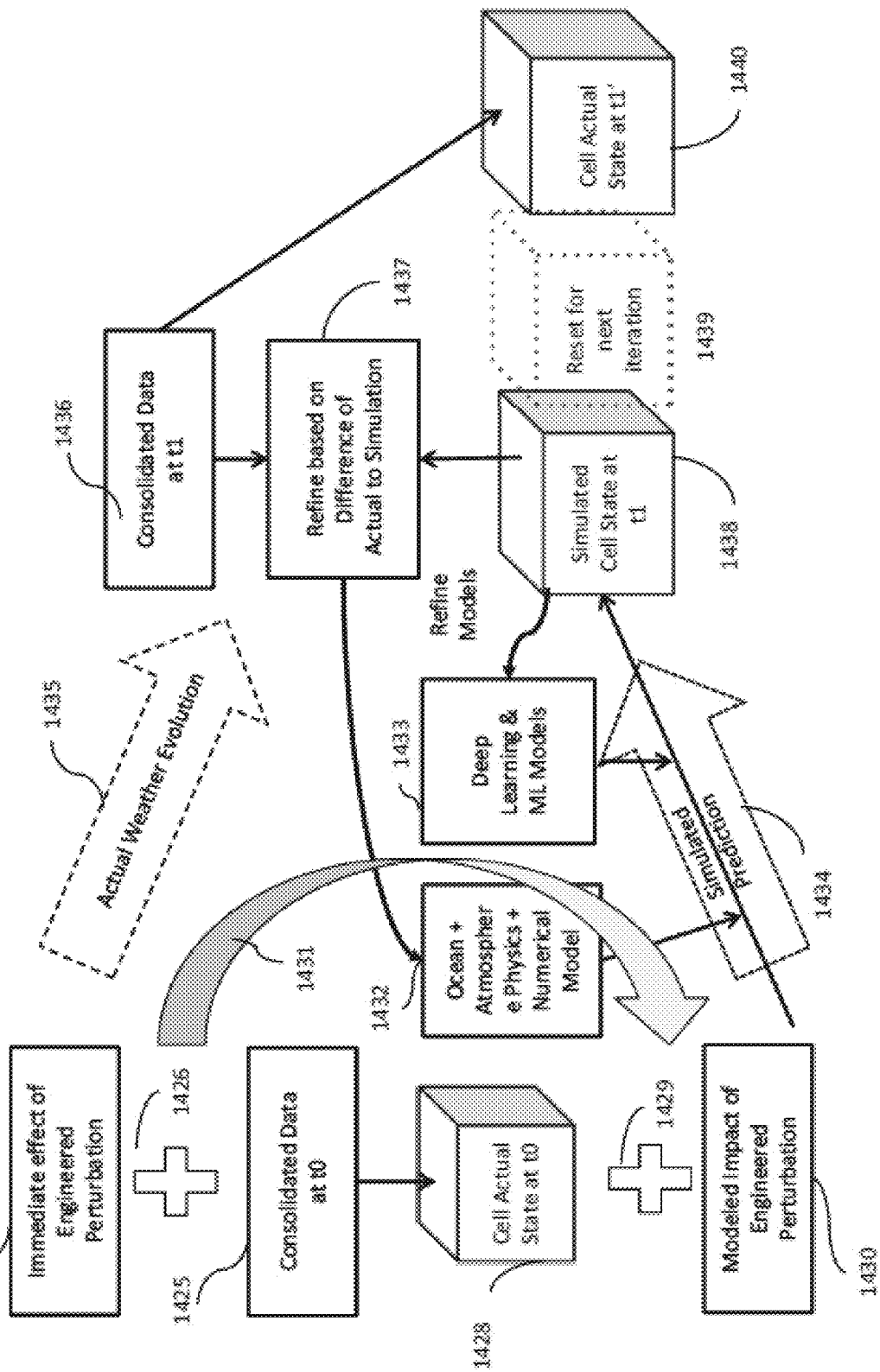
Fig. 14B Enhanced NWP

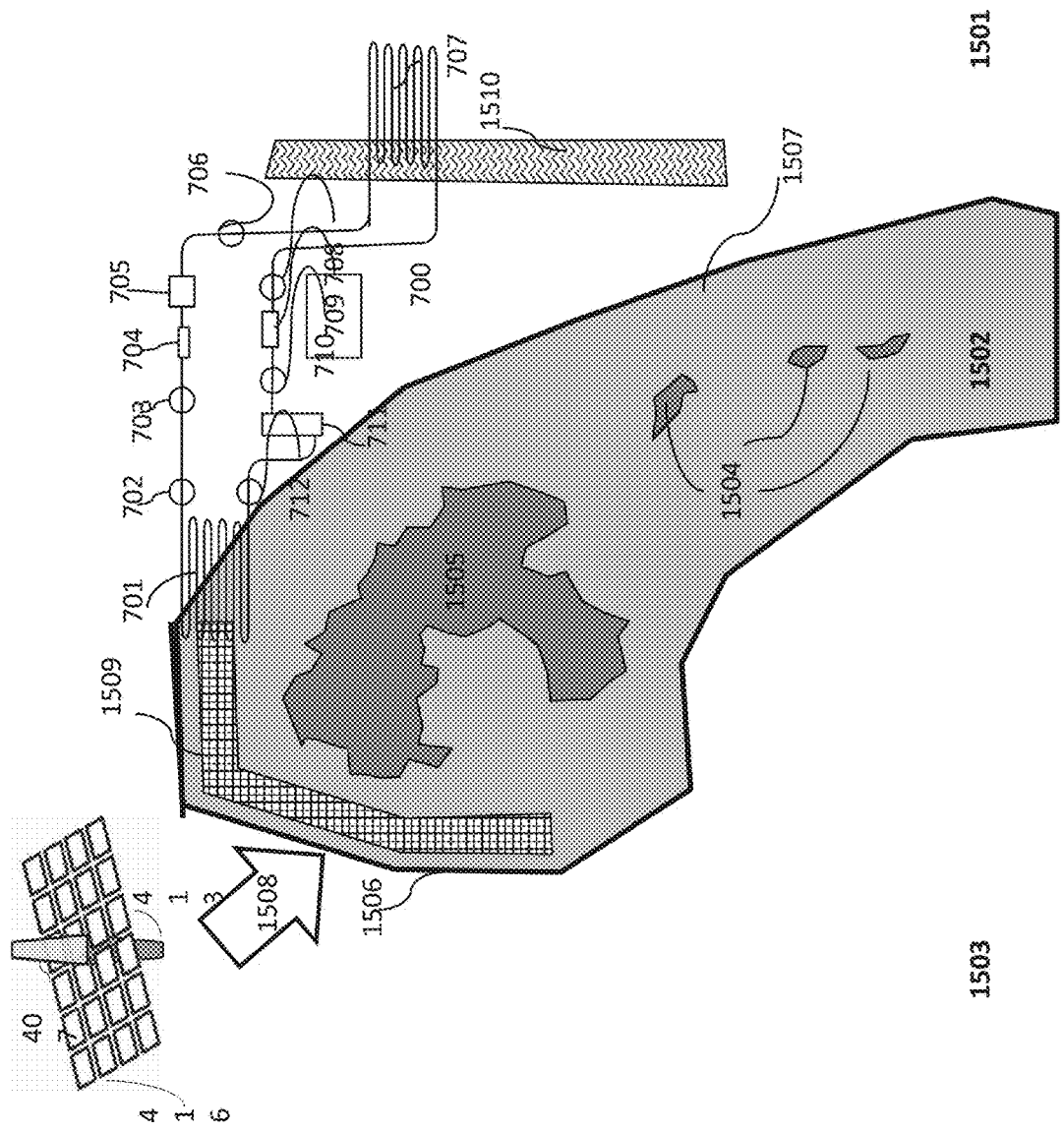
Fig. 15 Coral Reef and surrounding area

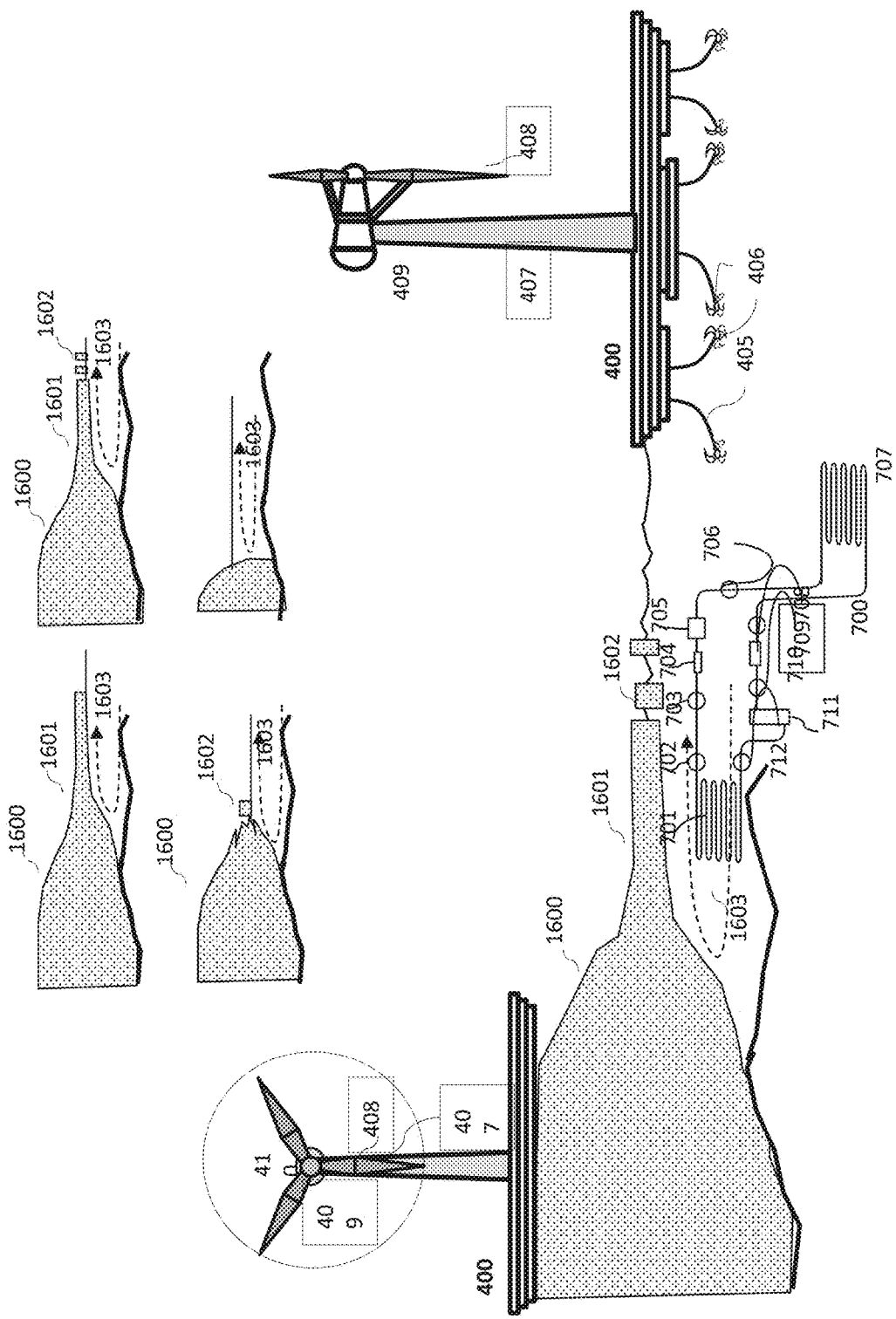
Fig. 16 Preventing Melting of Arctic Glacier

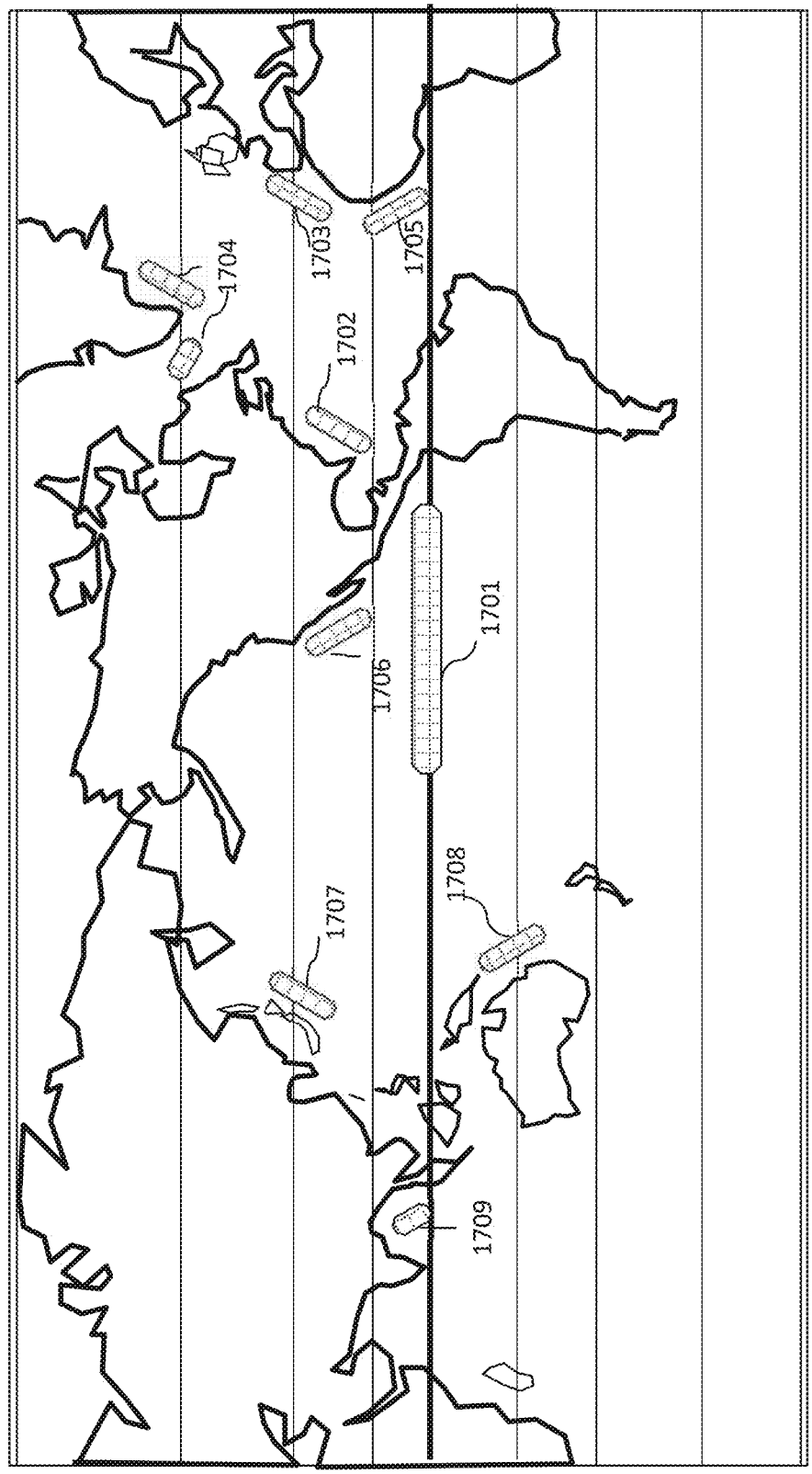
FIG.17 Controlling Global Climate

SURFACE MODIFICATION CONTROL STATIONS AND METHODS IN A GLOBALLY DISTRIBUTED ARRAY FOR DYNAMICALLY ADJUSTING THE ATMOSPHERIC, TERRESTRIAL AND OCEANIC PROPERTIES

PRIORITY CLAIM

This application is a continuation application of U.S. application Ser. No. 16/409,055, filed on May 10, 2019, which is a continuation application of International Application No. PCT/IB2018/051811, filed on 19 Mar. 2018 which claims priority from co-pending U.S. provisional application No. 62/473,499, filed on 20 Mar. 2017, entitled "Quarter Degree", naming as inventor Dr. Sunit Tyagi, and is incorporated it its entirety herewith, to the extent not inconsistent with the disclosure of the instant application.

FIELD OF THE INVENTION

The present invention relates to a method of controlling the global temperature rise driven by the accumulation of heat due to increasing greenhouse gases in the atmosphere. The invention further relates to climate modification and engineering systems and machineries used to modify wide area properties of atmosphere, ground and oceans. The invention further relates to design of renewable energy generation sources and systems to provide continual energy to drive climate modification machineries. The invention further relates to the continual sensing, monitoring, simulation and modeling of atmospheric and surface properties and coordinated storage and synthesis of the information in distributed and centralized information system. The invention further relates to design, control of temporal and spatial coordination of global array of such climate modification machineries with algorithms for learning and dynamic modification of response. The invention further relates to control of temperatures of coral reefs, arctic glaciers and southern pacific region related to El Nino oscillations.

BACKGROUND OF THE INVENTION

Anthropogenic emissions have increased the atmospheric concentration of Green House Gases (GHG) such as Carbon Dioxide, Methane, etc. and in turn these higher GHG concentrations have changed the energy balance of Earth; with net incoming energy estimated to now be in the range of 0.6 to 1 $W/m^2$, leading to higher accumulation of heat. The increased accumulation of heat on Earth's surface is predicted to inexorably change the climate, with average temperatures already increasing, and melting of Arctic and Antarctic ice masses leading to higher sea levels. This runaway process is already underway and many claim that cataclysmic changes cannot be averted.

A large body of research and scientific thinking has gone in to address the global challenge of climate change; and much of it has focused on reducing the GHG emissions, so as to slow down the process, by encouraging renewable energy generation, higher efficiency devices as well clean carbon technologies.

In addition, since concentrations of GHGs in Earth's atmosphere have already increased due to past emissions, that have led to irrevocable changes in energy balance, to counter these baked-in emissions, research is ongoing on technologies to decarbonize, or reducing the GHG in atmosphere by capturing and sequestering carbon and other compounds.

However, these technologies for clean generation, cleaning the air and efficient consumption are all expensive—increasing the cost of energy by 25% to 50%, making their adoption slow and difficult. The challenge is to develop technologies that are not only more affordable but also do not force energy austerity on billions of global citizens who are trying to improve their lifestyles, and in doing so will necessarily increase their need for higher quantity and quality energy. It is not possible; or fair, to limit the energy use in developing economies, as energy use increases concomitantly as standards of living improve. To enforce reduced energy use or affordability on under developed sections is to deny freedom to grow.

The advent of industrial revolution and burgeoning world population has led to significant increase in burning of fossil fuels, and as a result the atmospheric concentration of CO2 has increased steadily and is now over 50% higher than that of the pre-industrial age. Higher GHG concentration in the atmosphere gives higher back radiation from the green house gas that act like a blanket for the atmosphere this gives higher energy imbalance, and accumulation of heat on Earth's surface. With the higher GHG concentration energy imbalance on planet surface has steadily increased and the current estimates range from 0.6 $W/m^2$ to 1 $W/m^2$. The higher energy imbalance has led to increasing surface temperature of the Earth over the past century with the surface temperature increase is clear in the recent decades emerging from the decadal natural variations, and rising roughly 0.7 degrees Centigrade in last 50 years, for an average rise of 0.14 degrees/decade.

Most of earth's thermal capacity is in the oceans; the increase in energy stored that is dominating the climate system, is in ocean heat content. This accounts for more than 90% of the energy accumulated between 1971 and 2010. Most of this ocean heat remains near the surface due to the slow (rates spanning decades) of mixing of the ocean layers that remain stratified due to thermal and salinity differences. Although the ocean waters are in constant motion driven by winds and earth's rotation churning in gyres and currents, with the oceanic water moves from equatorial regions to the polar seas and back through surface and deep-water flows. These lead to some mixing of waters and transport of heat from across the equator. However, studies of the ocean currents and mixing show that for all the oceans the heat penetration to lower depths is very less. As a result of increased heating of ocean surface the seawater on surface is getting warmer, and the average planet temperature is rising. This is giving higher melting of the ice in Arctic and Antarctic regions. Melting of the ice shelve from underneath and above, leads to removal of buttressing ice sheets, eventually causing crevassing and calving of ice and melting at accelerating rate, further removing buttressing ice that is needed for structural stability and accelerating melting. The mass of ice shelves both in Greenland (Arctic) and the Antarctica has been steadily decreasing and is expected to accelerate. This melting of ice results in adding of fresh surface water with lighter densities and further stratification, but also increasing the mean sea levels. The addition of seawater from melting of ice shelves has been increasing the global mean sea level. The sea level also rises due to the warming of the water due to thermal expansion, increasing by nearly 58 mm for each 1° C. rise in temperature. The rate of sea level change is expected to accelerate with hastening of ice shelf melting, and increasing ocean heat content. The fresh water from melting ice has low salinity and therefore floats on the surface, with deeper layer of water having higher density due to higher salinity and colder temperatures, increasing stratification and creating a positive feedback of increasing surface temperatures.

Although the ocean currents lead to extensive movement across the globe, vertically the ocean water remains stratified, separated by differences in density due to temperature and salinity. The surface layer is warmer and lighter separated by buoyancy forces defining the pycnolcline layer that separates it from deeper colder and heavier water. The density of the water is lightest at the surface, driven by both higher temperatures at the surface due to solar heating and lower salinity due to addition of fresh water from precipitation such as rains, and melting of ice shelves. Horizontal and vertical currents also exist below the pycnocline in the ocean's deeper waters. The movement of water due to differences in density as a function of water temperature and salinity is called thermohaline circulation. Vertical temperature profile of the ocean is defined by a sharp drop in temperature near the surface, i.e. in the thermocline region, followed by a steady decrease to the bottom. While the surface waters can be as warm as 30° C., the temperature at sea bottom decreases steadily to around 2° C. to 4° C. fairly independent of latitudes, the temperature falls rapidly in upper 1000 m and is below 5° C. for most part of deeper ocean. It is important to note that the colder deeper seawater has been relatively unaffected by the changes in the surface temperature so far, and most of the ocean heat content addition has been at the surface.

However there is asymmetry in the energy imbalance between Southern and Northern oceans that drives ocean flows. The energy imbalance varies across the globe and is due to the fact that the Southern hemisphere is largely consisting of open oceans, while there is predominantly landmass in the North. The top of atmosphere (TOA) in southern hemisphere effectively sees a net input of solar radiation, while in the North it is fairly balanced out due to higher land temperatures. This extra ocean heat in Southern hemisphere is thus convected northwards by ocean flows and in turn is balanced by the wind driven atmospheric weather and which moves heat from North to South. Sub-tropical South Pacific is one of the Earth's major areas for heat accumulation and accounts for up to a quarter of the global ocean heat increase, with local heat accumulation also extending some below 2000 m depth, this deeper heat accumulation is due to a decade-long intensification of wind-driven convergence. The South Pacific heat content is driven by wind convergence and affected by the local La Nina or El Nino effects.

Oceans define Earth's thermal capacity as discussed they have taken up nearly 90% of the heat that has accumulated so far, but as stated above, this is confined usually only to the upper layers of the ocean as the ocean layers are mixed over the course of a year or a decade, limiting exchange of energy to the upper 700 meters of waters. If the entire body of water in ocean was well mixed and the heat currently accumulating is evenly distributed throughout the depths of oceans, the total thermal capacity of ocean can be used and the temperatures of the entire ocean, including that of sea surface, would rise by only 0.017 degrees Celsius each decade! Calculations show that if Earth was heating by roughly 0.6 $W/m^2$ and given the global surface area is $5.1 \times 10^{14}$ $m^2$, the buildup of energy is about $3 \times 10^{14}$ Joules per second, which is $9.5 \times 10^{22}$ Joules per decade. As an approximation, assuming the specific heat capacity of seawater is about 3,900 Joules per kg per degrees Celsius and the total mass of the oceans is $1.4 \times 10^{21}$ kg, this would mean that it would take $5.5 \times 10^{24}$ Joules to heat the entire ocean by 1 degree Celsius. Dividing the calculated heating rate above of $9.5 \times 10^{22}$ Joules per decade by $5.5 \times 10^{24}$ Joules per degrees Celsius we get the heating rate of 0.017 degrees Celsius per decade, so it would take about 600 years to raise the temperature by 1 degree Celsius. In reality most of this energy has been heating the upper few hundred meters giving the rates nearly ten times higher that are seen today.

Increasing GHG concentrations in atmosphere due to anthropogenic emissions are leading to an additional energy accumulation of roughly 0.6 to 1 $W/m^2$, and today this is causing an increase in global temperatures by roughly 0.17 C per decade. The common suggested approach to address this trend, and to avert worst-case cataclysmic impact, has been to reduce the emissions by not using fossil fuels and using renewable energy instead. There are several issues with this approach firstly the adoption of renewable energy is still slow and thus today it provides only a minor fraction of the total generation sources. The low adoption is mainly due to their high cost, also since the renewable sources are affected by incoming natural sources, the variability in generation is very high and less predictable, this impacts adoption and this concern is being addressed by using energy storage such as batteries but that adds to the expense. Secondly another concern with adopting only the strategy of reducing fossil fuel consumption is that the accumulated amount of GHG already emitted and in the atmosphere today, this will continue heating the planet and increasing the temperatures, so even stopping the emissions today will not reverse the trends underway. The technologies for carbon capture from atmosphere are under development but are expensive today costing upwards of 1000 US dollars for removal of every ton of $CO_2$, requiring investment equaling annual global GDP so as to reduce the GHG concentrations down to acceptable levels, and this will necessarily take a long time to counteract the ongoing emission and then remove the decades of accumulated gases from the atmosphere. So with the currently adopted approaches the planet warming trends cannot be reversed.

Throughout this specification and the claims which follow, unless the context requires otherwise, the word "comprise", and variations such as "comprises" and "comprising", will be understood to mean the inclusion of a stated feature or step, or group of features or steps, but not the exclusion of any other feature or step, or group of features or steps.

The reference to any prior art in this specification is not, and should not be taken as, an acknowledgement or any suggestion that the prior art forms part of the common general knowledge.

SUMMARY OF THE INVENTION

In a first aspect, the present invention provides a system for changing ocean surface temperature and other parameters including a plurality of photovoltaic cells receiving sunlight, each of said plurality of voltaic cells being connected to an energy generation unit, a plurality of wind turbines, driven by received wind, each of said plurality of wind turbines being connected to the energy generation unit, a plurality of ocean turbines, each of said plurality of ocean turbines being connected to the energy generation unit, the energy generation unit being operable to transfer energy and store said energy in a plurality of energy storage units, a plurality of horizontal pumps operable to deflect naturally occurring currents or to attenuate water currents, said plurality of horizontal pumps being positioned to create a desired ocean current profile, the plurality of horizontal pumps being connected to and drawing energy from the generation and energy storage units, a plurality of vertical pumps operable to pump water vertically to create a vertical flow of ocean water and churn and distribute matter thereby moving warmer surface water to cooler depths of the ocean, the plurality of horizontal pumps being connected to and drawing energy from the generation and storage units, a plurality of heat pumps to transport thermal energy operable to obtain a desired temperature depth profile and a desired temperature distribution, the plurality of heat pumps being connected to and drawing energy from the generation and storage units, a plurality of osmosis units operable to change salinity profile of the ocean surface water, the plurality of osmosis units being connected to and drawing power from the generation and storage units, a plurality of fan units operable to change wind profile on surface of water, the plurality of fan units being connected to and drawing power from the generation and storage units, and a plurality of long infrared wavelength radiation devices operable to emit to outer space within the atmospheric window to cool the environment as desired, the plurality of infrared emitter units being connected to and drawing power from the generation and storage units.

In a second aspect, the present invention provides a system for measurement, monitoring and data logging of atmospheric and ocean parameters including at least the following data instrumentation a plurality of thermometers measuring atmospheric and ocean temperature, each of said plurality of thermometers being connected to a data aggregation and processing unit, a plurality of barometers measuring atmospheric pressure, each of said plurality of barometers being connected to the data aggregation and processing unit, a plurality of hygroscopes measuring atmospheric relative humidity, each of said plurality of hygroscopes being connected to the data aggregation and processing unit, a plurality of anemometers measuring wind speed and direction, each of said plurality of anemometers being connected to the data aggregation and processing unit, a plurality of hydrophones measuring ocean current, each of said plurality of hydrophones being connected to the data aggregation and processing unit, a plurality of sonar based Doppler measuring ocean current, each of said plurality of Doppler instruments being connected to the data aggregation and processing unit, a plurality of electric conductivity meters measuring salinity of ocean waters, each of said plurality of conductivity meters being connected to the data aggregation and processing unit.

In a third aspect, the present invention provides an ocean based ocean and atmosphere parameter control system including a platform mounted on a rigid floating structure to form a composite floating platform, the composite floating platform being placed on one or more floating sub-structures, the floating sub-structures being hollow and operable to provide buoyancy, the floating substructures being placed on a plurality of floating chamber sections, the composite floating platform being attached to a plurality of cables operable to prevent the platform from drifting away, wherein at least one of the plurality of cables is fastened to the ground, at least one of the plurality of cables is fastened to anchor structures; and at least one windmill is positioned on the platform.

Embodiments of the invention seek to address the shortcomings of the prior art through the provision of a method of modifying and cooling the surface of the planet, where renewable energy may be applied to counteract the impact on temperatures, humidity, wind and ocean currents. This method may consist of building machineries to move heat away from the surface of the planet, specifically reduce the Surface Sea Temperature (SST) and by doing so reduce the global temperatures and modify the weather and climate. This may be achieved by pushing the heat accumulating into the oceans, deeper into the lower waters. Natural process tend to keep the heat near the surface, driven mainly by the stratification of water due to temperature giving lower density on surface and also salinity differences. This makes vertical transfer difficult and gives poor mixing of oceans due to naturally occurring currents and flows. This stratification leads to heating of the mainly the surface layers, thus the global temperature is on an average increasing at roughly 0.14 degrees Celsius per decade. By mixing the heat into the oceans better, the rate of average surface temperature rise may be able to be slowed down by nearly an order of magnitude. This may be achieved by recognizing that surface sea temperature (SST) is a key factor determining the local weather and in general short and long-term climatic conditions, a way to control SST and mixing of Oceans will help slow down the immediate temperature rise and climatic change.

Embodiments of the invention also seek to reduce the surface sea temperature by movement of heat away from the surface, by using pumps either directly to move seawater where warm water is moved deeper into cold oceans. Seawater pumps may be used for operation in ocean at varying depths for current modification with amplification, attenuation and sideward deflection of currents on the surface and deep-ocean current. These pumps may be placed at different depths to influence overall structural flow of thermoclines, and can be used for vertically mix thermocline layers in ocean and then used to control the surface water temperature and salinity. The pumps may be designed for changing flow strength either inline, opposing, or perpendicular and can be mobile so as to move to areas of interest and can also be spatially separated out far from generation location. Another method would to be use closed cycle heat pumps that move a thermic fluid to carry the heat; the thermic process transports higher heat capacity so a smaller volume has to be pumped around. Heat pumps are preferred because of their energy efficiency to move the heat from the surface to deeper ocean or away from melting arctic ice or to counter the heating of coral reef surface. Besides temperature, other local properties such as humidity can be controlled with work done by misting devices or conversely dehumidifiers. Similarly using reverse osmosis or mixing surface waters with deeper water can change salinity of the surface waters. Another approach could be to use renewable energy for doing work that does not heat the surface, such as driving chemical electrolysis or other endothermic reactions, for instance using hydrolysis for large scale hydrogen production that uses a high amount of energy, in doing so removes it from the surface heating. Another type of work that can be done would be to convert the energy to infrared that is then radiated back to the deep space through the known atmospheric spectral window of light wavelengths between 9 to 13 um!

Embodiments of the invention use renewable energy sources to drive machines, pumps and heat pumps. Electricity may be generated using wind turbines, solar panels and/or ocean current turbines. The wind turbines and solar power systems may be built on floating pontoons structures, rigs or manmade islands, by combining the counteracting mechanical requirements of solar and wind structures for overall balance and cost optimization.

In other embodiments, the system may be modified in design suitable for local use, such as wind turbines or solar panel farm covering ice on the Antarctic to shade the field from direct sunlight, thus preventing of melting due to the sunlight, while the energy generated is used to drive heat pumps to cool the warm waters below, or using seawater pumps to overturn warm waters away from ice. In some cases by using electricity generated from solar or ocean currents, wind turbines can also be driven in reverse to be used as a fan to generate wind as desired for local weather modification.

Embodiments of the invention may use a global network of sensor arrays to measure and collect data over large area of properties such as wind speeds & direction temperature, salinity, current flow directions and measuring these parameters extending the information in vertical directions to get height & depth profiles. The sensor nodes with automated calibration and operational modes, may communicate with base stations or between the various stations in a mesh using wireless or wired network. The collected data may be collated at the edge and at centers of network to allow local data validation and crosschecking then stored in specialized distributed database. Regular data sanitization may be performed in the local regions with indexing and labeling and data synthesis performed to provide 4D (space+time) GIS for variables of interest along with their key statistics.

Embodiments of the invention involve the design of an array of control stations that may be spread across the globe and the functioning of their machines and pumps coordinated across long distances. By using an array of large number of pumps or devices, the system may be able to affect large areas with each device distributed in the array handling a reasonable size of energy or area. Each element in the array may break down the problem of control to its local region of influence, however the overall and bigger impact may be coordinated by control of each station in the array to modify the ensemble as a whole. Similarly the long-term trend may be impacted and controlled by sequence of designed temporal perturbations.

In other embodiments, the global placement of the machines in the array on the open seas is designed so as to be most efficacious and this is done by using gridding patterns, densities and algorithms as developed in numerical computing. Another approach for placement of the arrays is to leverage crucial geographical areas, typically boundaries between sea and land, which naturally have big impact on weather and climate, for instance the ocean currents such as Gulf Stream, Kuriosho and others critical global climate levers such as the wind driven convergence currents impacting El Nino. The arrays may be placed to specifically target and modify these flows i.e. strengthening, weakening or deflection and in doing so these flows are used to amplify the work done by machines in the array. In addition control stations may be arrayed to address storms such as Hurricane/Typhoon. Critical placement of control stations arrays is where the storm paths tend to converge and concentrate, especially where they build up in the subtropics, such as near the Tenerife Islands, Caribbean, Florida and Gulf of Mexico, Hawaii, Philippines, Taiwan, Korea, and Andaman Islands in Bay of Bengal.

In other embodiments, numerical modeling simulations may use the data collection of wind, surface temperature over large areas to refine numerical weather prediction. These simulation models may then be calibrated against historical and episodic data, and refined based on the derived fits. The prediction algorithms may then be used with designed controlled perturbations deployed through the array of control stations. The results of predictions may then be compared to the experimental observations that result from the forced perturbations, thus completing the information feedback loop for further refining the algorithms. The dynamic algorithms may evolve using distributed machine learning and deep learning methods to the refine the predictive capabilities and control. These predictive algorithms may then be used to drive larger area and longer term coordinated perturbations that are engineered to guide the weather and climate to a desired state.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 1 depicts details of naturally occurring stratification of oceans that leads to presence of surface layers of higher temperature thermocline, lower salinity as depicted by the halocline and lower density shown by pycnocline;

FIGS. 2A-B depicts one embodiment of a control station system using a renewable energy sources to generate electricity or thermo mechanical energy and using that energy to drive machineries and do work in a plurality of ways to impact a plurality of climate parameters, in accordance with an aspect of the present invention;

FIG. 3 depicts one embodiment of a system a renewable energy control station for generating energy for doing work using renewable sources such as combination of solar, wind, ocean currents and waves, and performing computing and information processing and communicating the data in accordance with an aspect of the present invention;

FIG. 4A-K depicts one embodiment of a physical and mechanical design of a renewable energy control station for generating energy for doing work using renewable sources such as combination of solar, wind, ocean currents and waves, and using counter-balancing design elements to reduce overall cost, in accordance with an aspect of the present invention;

FIG. 5 depicts one embodiment of a system for an engineered interaction between ocean and atmosphere comprising a plurality of machines to modify a plurality of parameters such as pressure, temperature, humidity, concentrations and currents and depth and height profiles of these parameters, in accordance with an aspect of the present invention;

FIG. 6 depicts one embodiment of a system for cooling the surface of the ocean and atmosphere by using a plurality of pumps to bring deeper cold water to the surface or moving the surface water by inducing or modifying currents at different depths and positions, in accordance with an aspect of the present invention;

FIG. 7 depicts one embodiment of a system for cooling the surface of the ocean and atmosphere by using plurality of heat pumps using a closed loop design of thermic fluid and exchangers to move heat from the surface to cooler depths, in accordance with an aspect of the present invention;

FIG. 8 depicts one embodiment of a system for collecting data using a plurality of types of multiple sensors to measure a plurality of parameters for atmosphere and ocean at different depths and positions, in accordance with an aspect of the present invention;

FIG. 9 depicts one embodiment of a system where the data from plurality of sensors is used to cross check, signal process, re-compute and statistically validate the incoming measurements and information processing is done at the station to extract relevant structure and summarize the data which is stored in a distributed manner to ensure correctness, in accordance with an aspect of the present invention;

FIG. 10 depicts one embodiment of a system for designing an array of control stations positioned at different depths and locations which then act in a coordinated to manner ensure larger area or duration perturbation, in accordance with an aspect of the present invention;

FIG. 11 depicts one embodiment of a system where the placement of the stations in the array is determined to maximize the efficacy of coordinated action to collect data and force changes in climate, in accordance with an aspect of the present invention;

FIG. 12.A depicts one embodiment of a system design of an array of control stations positioned at geographic locations where the action of stations in a coordinated is most effective due to the naturally occurring currents and features of weather pattern, in accordance with an aspect of the present invention;

FIG. 12.B depicts one embodiment of a system design of an array of control stations positioned at geographic locations where the coordinated action is most effective to influence and counter cyclogenesis and strengthening of Hurricanes, in accordance with an aspect of the present invention;

FIG. 13A-C depicts one embodiment of a system Numerical Weather Prediction where the data from sensor network with wider coverage and finer granularity is used to calibrate the modeling and better predict the features of observed weather pattern, in accordance with an aspect of the present invention;

FIG. 14A-B depicts one embodiment of a system which uses advanced data science and Artificial intelligence techniques of Machine Learning and Deep Learning to provide feedback from the measured response to a forcing of climate and then to further refine Numerical Weather Prediction system and design next round of forcing in a continual improvement manner, in accordance with an aspect of the present invention;

FIG. 15 depicts one embodiment of a system design of an array of control stations positioned in reed islands and shoals for coordinated action to control temperature in reef and shoal waters, in accordance with an aspect of the present invention;

FIG. 16 depicts one embodiment of a system design of an array of control stations positioned in Arctic and Antarctic for coordinated action to control temperatures and reduce the rate of ice melt and breaking off ice shelves into sea, in accordance with an aspect of the present invention;

FIG. 17 depicts one embodiment of a system that forces changes in sea surface temperature over oceans using renewable energy sources that drive machines performing weather modifying work, that is coordinated over large area arrays, leveraging naturally occurring currents to modify the weather, using Numerical Weather Prediction along with Artificial Intelligence techniques to refine and control long term climate direction, in accordance with an aspect of the present invention;

DETAILED DESCRIPTION OF THE EMBODIMENT(S) OF THE INVENTION

Figure 4E:
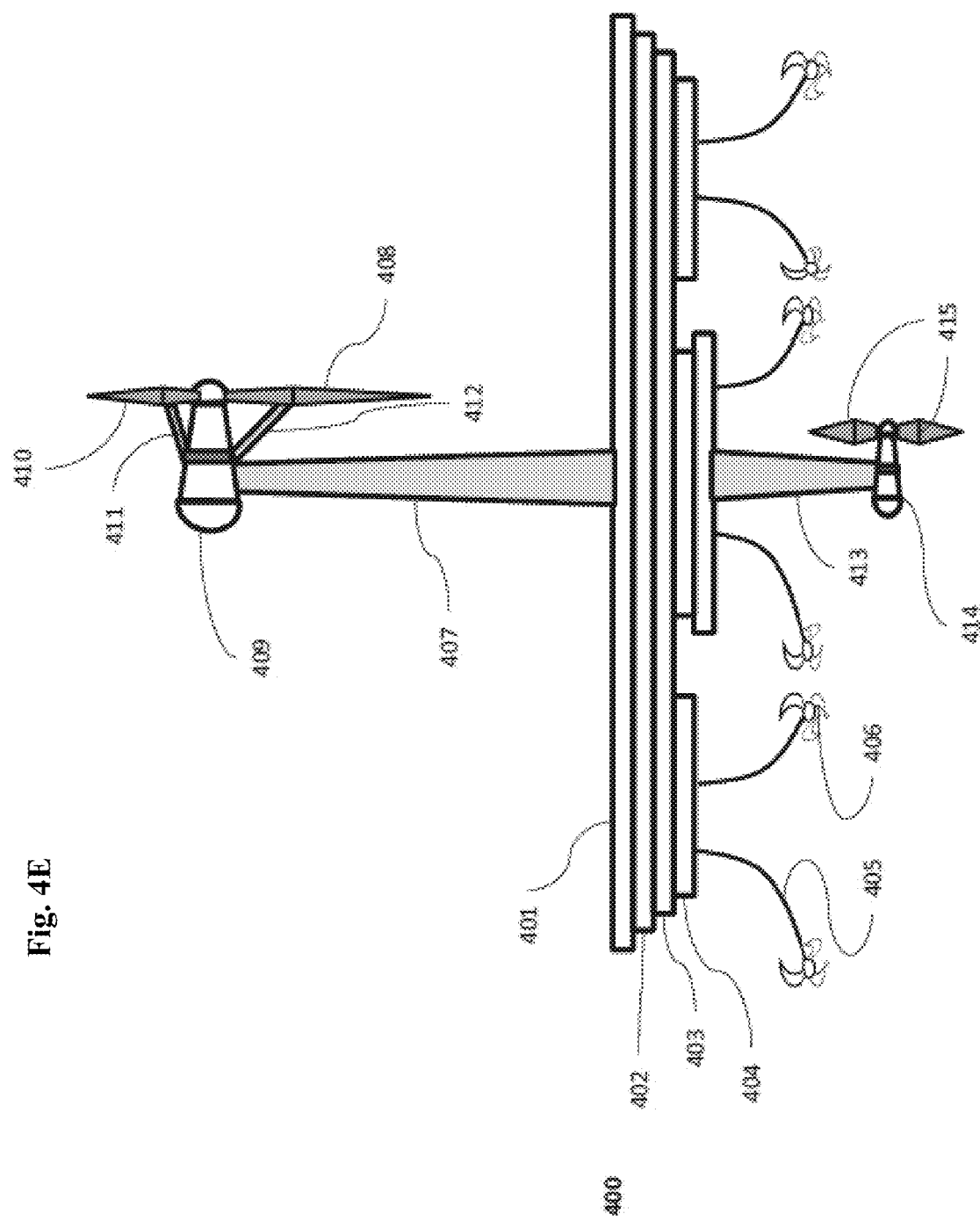

As used herein, the terms "windmill, "wind turbines" and "turbines" are used interchangeably, and unless otherwise specified include any rotor, stator, blades, nacelle, tower, cabling, controllers, housing, frame, etc., having one or more electricity generating components for converting energy from wind to mechanical power to electricity suitably converted and generated.

As used herein, the terms "ocean current turbines" and "submerged turbines" are used interchangeably, and unless otherwise specified include any rotor, stator, blades, nacelle, structural posts, cabling, controllers, housing, frame, etc., having one or more electricity generating components for converting energy from ocean currents to mechanical power to electricity suitably converted and generated.

As used herein, the terms "wave convertors" and "wave machines" are used interchangeably, and unless otherwise specified include any moveable parts, stator, blades, structures, cabling, controllers, housing, frame, etc., having one or more electricity generating components for converting energy from ocean waves to mechanical power to electricity suitably converted and generated.

As used herein, the terms "solar photovoltaic", "PV system" "PV modules" and "solar cells" are used interchangeably, and unless otherwise specified include any solar cells, cables, DC-DC convertors or inverters along with electronics controllers, housing, frames, structures, etc., having one or more electricity generating components for converting energy from sunlight to electricity suitably converted and generated.

As used herein, seawater flows 'across the heat exchanger' and coolant flows "through the heat exchanger". Flowing across the heat exchanger refers to water passing across the outside of the conductive tubing forming the one or more water flow paths around the exchanger tubing mesh, while flowing through the heat exchanger refers to the coolant (e.g. liquid) passing through the heat exchangers one or more coolant flow paths formed by the conductive tubing. One example of liquid coolant employed in a liquid-to-liquid heat exchanger is water. However, the concepts disclosed herein are readily adapted to use with other types of liquid coolant. For example, one or more of the liquid coolants may comprise a brine, a fluorocarbon liquid, a liquid metal, or other similar coolant, or refrigerant, while still maintaining the advantages and unique features of the present invention.

Reference is made below to the drawings, which are not drawn to scale for reasons of understanding, wherein the same reference numbers used throughout different figures designate the same or similar components.

FIG. 1 depicts the natural depth profiles of properties of interest for nominal ocean water cross-section; the properties of interest are the Temperature (in ° C.), the Salinity in Practical Salinity Units (Electrical conductivity) and the Density (g/cm$^3$). The depth profiles 100, are shown in two panels 100A and 100B.

FIG. 1, panel 100A shows the Density profile 103 and Temperature profile 104. As seen in profile 103, surface water being much lighter in density with a steep change of density within top 50 to 1000 meters of surface. The density profile drop then tapers off below the depth line marked as Pycnocline 102, and the region of sharp change is shown with a light grey fill. As seen in profile 104, surface water is also higher in temperature with a steep change of temperature within top 50 to 1000 meters of surface. Temperature profile drop then tapers off below the depth line marked as Thermocline 101, and the region of sharp change shown with a grey fill. It is noted that the relative position of Pycnocline 102 and Thermocline 101 are illustrative only and in reality these positions could vary from section to section both in absolute depths and in relative placements.

FIG. 1 panel 100B shows the Salinity profile 107 and Temperature profile 108 (same profile as 104). As seen in profile 107, surface water has much lower salinity due to mixing of fresh water from rain or rivers mixing on the top and with a steep change of salinity within top 50 to 1000 meters of surface. The salinity profile drop then tapers off below the depth line marked as Halocline 106, and the region of sharp change is shown with a light grey fill. As seen in profile 108 (same profile as 104), the surface water is also higher in temperature with a steep change of temperature within top 50 to 1000 meters of surface. Temperature profile drop then tapers off below the depth line marked as Thermocline 105, and the region of sharp change shown with a grey fill. It is noted that the relative position of Halocline 106 and Thermocline 105 are illustrative only and in reality these positions could vary from section to section both in absolute depths and in relative placements.

Naturally many forces that move mass and energy in the water drive processes occurring in the seas and oceans. Some of the forces moving the water mass include gravity, buoyancy, convection and turbulence or disordered flow due to transfer of kinetic energy from wind to the ocean surface or tidal forces driven by earth-moon gravitational pull and waves driven by the rotation of earth and generation of ocean gyres due to resultant action of Coriolis and multiple forces. While the heat in the system is moved along with mass driven by convection, diffusion and thermal balance amongst others. These forces tend to keep the heat near the surface, this is because the heating is predominantly by sunlight on the surface, and then constrained to remain there driven mainly by the stratification of water due to temperature profile 104 which in itself gives lower density due to expansion of water on the surface as shown in 103, in addition the input of fresh water on the surface from rains and rivers lead to lower salinity and density as shown in 107 and 103 respectively. The salinity and density rise quickly moving towards the bottom, due to sinking of the dissolved solids, this further increases the sharp nature of density drop. As a result of these natural processes, the trio of Halocline, Thermocline and Pycnocline are well defined regions which together lead to a steady state profile of lower density and salinity on the surface which in turns keep the heat collected at the surface confined to the top region. This stratification makes vertical transfer of heat and mass difficult and gives poor mixing of oceans due to naturally occurring currents and flows.

The turbulent processes driven by wind and wave coupling are also not very strong and prevalent due to poor coupling between the atmosphere and ocean, driven mainly by interactions on rough surfaces or near land masses. The low coupling of energy leads to poor direct correlation of parameters and also slow and inefficient mixing across the depth due to these natural processes. Thus the wind interaction does not break the stratification.

This stratification leads to heating of the mainly the top few hundred of surface layers of water, since this is a limited amount of water mass, it has effectively lower thermal capacity and as a result for a given amount of extra energy input the surface temperature rises faster than they would have if there was better mixing of water. Thus with natural processes there is strong stratification and confinement of the heat to the surface as a result the global temperature is on an average increasing at roughly 0.14 degrees Celsius per decade!

Thus, there are numerous reasons for naturally occurring sea surface temperature to increase rapidly with currently occurring processes, which are addressed by concepts, described herein below. These reasons include Heating of surface water by absorption of solar energy on top.

Injection of fresh water on surface due to precipitation or due to rivers and ice melting, this leads to low salinity water on the surface.

Steep changes on surface of salinity and temperature give rise to sharp reduction of the density on the surface of oceans.

These surface profiles lead to stratification of surface water, driven by Thermocline, Halocline and Pycnocline regions stabilizing each other.

Stable stratification of seawater gives poor vertical mixing of waters.

As a result of this the energy is confined to the surface.

As only surface is actively collecting the heat the effective thermal capacity of the ocean is reduced by an order of magnitude, and the surface sea temperature rises quickly.

The shortcomings of the naturally occurring processes may be overcome and additional advantages are provided by embodiments of this invention, through the provision of a method of modifying and cooling the surface of the planet, where renewable energy is applied to work to counteract the impact on temperatures, humidity, wind and ocean currents. In an embodiment, this method consists of building machineries to move heat away from the surface of the planet, specifically reduce the Surface Sea Temperature (SST) and by doing so reduce the global temperatures and modify the weather and climate. This is achieved by pushing the heat accumulating into the oceans, deeper into the lower waters. By mixing the heat into the oceans better, the rate of average surface temperature rise can be slowed down by nearly an order of magnitude. This is done by recognizing that surface sea temperature (SST) is a key factor determining the local weather and in general short and long-term climatic conditions, a way to control SST and mixing of Oceans will help slow down the immediate temperature rise and climatic change.

Generally stated, disclosed herein below are methods for reducing the rate of rise of surface sea temperature by moving the extra heat away from the surface deeper into the ocean waters.

If the entire body of water in ocean was well mixed, thus the profiles 103, 104,107 and 108 would not have the sharp structure near the surface, instead there would be a smooth shape of profiles for density, salinity increasing while the temperature decreasing with higher depths. With vertical mixing of waters or movement of heat, the extra heat due to greenhouse gases that is currently accumulating near the surface will get evenly distributed throughout the depths of oceans. This would mean that the temperature rise would be contained by the total thermal capacity of ocean. As can be seen this is much larger amount, higher by nearly an order of magnitude. If the heat is moved deeper into the ocean, calculations show that for the current rate of extra heating, the temperatures of the entire ocean, including that of sea surface, would rise by only 0.017 degrees Celsius each decade! This would be significant slowing down of the present heating trends and will be critical to slow down the processes currently hastening towards a warmer global climate. The runway heating has significant impact in terms of extreme weather events, rise in sea water levels with resultant flooding of low lying coastal areas. By slowing this rate of rise, onset of such events can be delayed and even averted. These concepts will now be elaborated and presented, although preferred embodiments have been depicted and described in detail herein, it will be apparent to those skilled in the relevant art that various modifications, additions, Substitutions and the like can be made without departing from the spirit of the invention and these are therefore considered to be within the scope of the invention as defined herein below.

In one embodiment, shown in FIG. 2.A, renewable energy source are tapped and converted to electricity using renewable energy conversion methods, the electricity thus generated is used to drive machinery used to modify the local weather properties. In another embodiment, shown in FIG. 2.B, renewable energy source are tapped but are converted to thermo-mechanical energy using renewable energy conversion methods, which is then used to drive machinery used to modify the local weather properties.

In FIG. 2.A, the incident renewable energy in form of sunlight is converted to electricity using photovoltaic system or solar cells and modules 201. Energy from wind is converted to electricity using wind turbines 202, and renewable energy in ocean currents and waves is converted to electricity using ocean vanes and turbines 203. The electrical energy can be directly used or excess stored in electrical storage 204 such as batteries, ultra-capacitors or circuits for later use.

The energy from 201, 202, 203 and 204 can be pooled and shared across multiple machineries and circuits, these machineries include horizontal pumps 205, that are used to pump water in horizontal direction to create, enhance or attenuate water currents 210 or deflect naturally occurring such as Gulf Stream 211 and these could be placed at varying ocean depths to create a desired profile of currents. These currents can be used to force mixing for modifying surface temperatures or changing the geographical spread of the water as required.

The energy can be also used for vertical pumps 206, which pump water in vertical direction to create flow vertically for purpose of vertical mixing in terms of upwelling or down-welling 212, and churning 213 or redistributing matter and by doing this moving cooler deep water to surface to reduce the surface temperature increase the surface density and salinity, in effect changing the profiles 103, 104, 107 and 108 as required.

Another use of energy shown in FIG. 2A is to transport thermal energy done using closed or open cycle heat pumps 207. The heat pump design described herein below, transports heat without incurring the energy cost of transporting large amount of matter. With heat pumps the thermal energy can be moved laterally 215 to move it out of a shallow area such as coral reefs, alternatively the heat can be moved deeper into ocean 214 changing temperature profiles 104 & 108 thus effectively utilizing the full thermal capacity of ocean volume, and slowing the rise of the surface sea temperature.

Another use of energy is to change the salinity profile 107 using devices which reduce the ionic concentration with osmotic pumps 208 to remove ions or adding salts or ionic chemicals to modify the salinity 216 as desired. Since naturally the surface salinity is low, stratifying the surface waters, addition of salts on surface will increase the density of the warm waters sinking them to promote better mixing, conversely the salt can be extracted from deeper water reducing the density at lower depths and causing the upper waters to be more saline and denser thus promoting vertical mixing.

Another use of energy is to change the humidity 217 at the surface of ocean by using machineries such as mister (misting devices) or de-humidifiers 209. These devices by modifying the immediate vicinity of humidity can cause extra interaction between the ocean and the atmosphere especially layers of air right above the ocean and modify the water content as the surface wind rises upward. These allow the coupling of energy between air and ocean to be engineered as required.

In FIG. 2.B, the incident renewable energy in form of sunlight is converted to thermal energy using solar thermal system 218, or converted to mechanical energy by driving a turbine. Wind energy can be converted to mechanical energy using wind turbines 219, and renewable energy in ocean currents and waves is converted to mechanical energy using ocean vanes and turbines 220. The kinetic mechanical energy can be directly used or excess stored in thermo-mechanical storage 221 such as flywheels or thermal storage such as phase change material or high thermal capacity matter for later use, where the thermal energy is converted back to mechanical with turbines driven by heat.

The energy from 218, 219, 220 and 221 can be pooled and shared across multiple machineries and circuits, these machineries include horizontal pumps 222, that are used to pump water in horizontal direction to create, enhance or attenuate water currents 227 or deflect naturally occurring such as Gulf Stream 228 and these could be placed at varying ocean depths to create a desired profile of currents. These currents can be used to force mixing for modifying surface temperatures or changing the geographical spread of the water as required.

The energy can be also used for vertical pumps 223, which pump water in vertical direction to create flow vertically for purpose of vertical mixing in terms of upwelling or down-welling 229, and churning 230 or redistributing matter and by doing this moving cooler deep water to surface to reduce the surface temperature increase the surface density and salinity, in effect changing the profiles 103, 104, 107 and 108 as required.

Another use of work done as shown in FIG. 2B is to transport thermal energy done using closed or open cycle heat pumps 224. The heat pump design described herein below, transports heat without incurring the energy cost of transporting large amount of matter. With heat pumps the thermal energy can be moved laterally 232 to move it out of a shallow area such as coral reefs, alternatively the heat can be moved deeper into ocean 231 changing temperature profiles 104 & 108 thus effectively utilizing the full thermal capacity of ocean volume, and slowing the rise of the surface sea temperature.

Another use of work done is to change the salinity profile 107 using devices that reduce the ionic concentration with osmotic pumps 225 to remove ions or adding salts or ionic chemicals to modify the salinity 223 as desired. Since naturally the surface salinity is low, stratifying the surface waters, addition of salts on surface will increase the density of the warm waters sinking them to promote better mixing, conversely the salt can be extracted from deeper water reducing the density at lower depths and causing the upper waters to be more saline and denser thus promoting vertical mixing.

Another use of energy is to change the humidity 234 at the surface of ocean by using machineries such as mister (misting devices) or de-humidifiers 226. These devices by modifying the immediate vicinity of humidity can cause extra interaction between the ocean and the atmosphere especially layers of air right above the ocean and modify the water content as the surface wind rises upward. These allow the coupling of energy between air and ocean to be engineered as required.

In one embodiment, the sources and machineries are all located in a physical co-located cluster and structure referred as Control Station, a functional embodiment of that 300 is shown in FIG. 3. The Control Station consists of a plurality of Power Sources 301, including those using wind 302, solar 303, ocean 304, waves 305, and batteries for storage 306. These power sources 301 through 306, are used to generate useable energy from respective renewable resources. Such as 302 consists of wind turbines driven to extract mechanical energy from wind and either convert to electricity or used directly as mechanical energy. Similarly 303 converts solar energy into useable form of electrical, thermal or mechanical energy, while Ocean turbines convert ocean energy 304, while wave turbines and motors convert wave energy 305, finally batteries and storage systems are used to capture excess power for later use.

These power sources 301 through 306 are used to drive machineries and systems 307, consisting of pumps 308, fans 309, heat pumps 310, radiative cooler 311, humidity control devices 312, and gas exchangers 313. Pumps 308 are used to move water around to modify the thermal, salinity and density profiles or water currents. The fans 309 are turbines used in reverse to drive changes in wind patterns and affect the mixing of atmosphere and its interaction with ocean. Heat pumps 310 are used to move mainly heat from one location to another to modify the temperature profiles vertically or horizontally. Radiative coolers 311 are devices that take electrical energy and emit in infrared around 9 micrometer wavelengths and thus cool by radiating the extra energy to outer space. This is because by emitting in the atmospheric absorption window range of wavelength between 8 um to 10 um no absorption takes place in the atmosphere and the radiation is directly sent to outer space which is lot more efficient as a cooler. Humidity control devices 312 such as misting and dehumidifying machines change the relative humidity in the proximity and thus impact the interaction between the ocean and atmosphere, this can be used to modify precipitation patterns and control air temperatures and winds. Similarly Gas exchangers 313, can be used to change the amount of gas interacting with oceans affecting the coupling of energy and nature and concentrations of gases and nutrients in the ocean impacting the biosphere. The control station 300 can be used in the manner described in FIG. 2A and FIG. 2B to engineer the profiles 103, 104, 107 and 108 as described and also the lateral large area nature of these and other parameters. Besides temperature, other local properties such as humidity can be controlled with work done by misting devices or conversely dehumidifiers. Similarly using reverse osmosis or mixing surface waters with deeper water can change salinity of the surface waters. Another approach would be to use renewable energy for doing work that does not heat the surface, such as driving chemical electrolysis or other endothermic reactions, for instance using hydrolysis for large scale hydrogen production that uses a high amount of energy, in doing so removes it from the surface heating. Another type of work that can be done would be to convert the energy to infrared that is then radiated back to the deep space through the known atmospheric spectral window of light wavelengths between 9 to 13 um!

Another key set of systems in the Control station 300 are the communication and computing systems 314. These systems are used to collect the data and establish communications with a distributed information system via satellite communications 315 or wireless or wired sensor network 316 and connected with other stations using undersea optical or copper cables and other means of connectivity. In addition by using onboard computers 318 and data storage 319 the data collected can be validated and cross checked before and after communication and complete information processing done 320.

In another embodiment, the control station are engineered to be self sufficient to deliver the functional requirements laid out in 300. In order to be able to work at a rate high enough to influence the local weather, or the trend and long term climate, the control stations have to do meaningful work at a scale large enough and over durations of days and months, thus the energy generation systems have to provide large amount of energy. These control station are proposed to be powered by renewable energy that can be stored using batteries, so that they can operate for decades altogether, and to ensure that energy is not a limitation for type and quantity of the work to be done. The specific renewable energy sources can be combination of Wind, Solar, waves, or Oceanic currents, depending on location and time of the day or year. The primary source of power will be wind, as technology for offshore windmills is maturing and costs are coming down to make it viable. In addition, winds are present near the coasts and in the open seas, the wind power across the oceans averages around 500 $W/m^2$, however depending on the location, geography and the season. Generation at a site can be predictably estimated and the historical information is available and in most regions the energy from wind is plentiful for our purpose. However, there are areas where winds are not strong, one such area is in the sub tropical Pacific: the infamous windless 'doldrums'. Stations located in these specific areas are designed to not depend on wind instead they use solar power in combination with oceanic current and or waves. In order to have reasonable and significant impact and to cause the required amount of perturbation in the local conditions, it is imperative to have significant amount of power. On the other hand, the engineering systems size and design should be consistent with prevailing capabilities and system sizes that are commercially available. Recent designs of offshore wind platforms are targeted around 5 to 10 MW. One embodiment of the station uses sizes of around 5 to 10 MW in size, so that the design of turbine and platform can be similar. With these two considerations, the systems should be sized to be around 5 to 10 MW driven by renewable energy sources. To generate 10 MW using winds along the coast range there is sufficient power across the globe (500 $W/m^2$), albeit it depends on the seasons. The data shows that in the open oceans winds are strong enough to generate most of required power from them. These winds can be intermittent and do vary significantly during the day, with differences in ocean and air temperatures driving local changes between day and night, these effects are strongly modulated with proximity to land masses, yet larger changes are seen due to seasons. In terms of the size of the turbine itself, larger sizes allow reduction in cost of the system and also its operational cost with lower fraction spent on overheads such as superstructure to hold the turbines and also circuits for power evacuation or station control. Industry capability trends the wind turbines of 10 MW will be possible in next decade and these can be with 50 meters to 150 meter high masts and diameters of 50 meter to 150 meter. Depending on the depth of waters different types of the platform or pedestal for the turbines are designed and used. By using large 10 MW station the cost of these structures is better amortized for the station.

Solar power generation is possible across most of the regions, except perhaps the Arctic and Antarctic; where snow cover is a concern, however solar is key where winds are low (doldrum latitudes). But, solar panels require large areas, for instance a 1 MW plant capacity requires minimally 6000 square meters of area. This may be possible by covering all available surfaces of station buildings and turbine towers, or by building a floating array on a pontoon or platform of say 80 m×80 m. For larger capacities it will be necessary to use large fields of floating arrays. Since solar power varies with time of the day, the power generated can be best used in conjunction with storage, which will allow it to be dispatched when needed and used optimally.

The Gulf Stream, is a strong and nearly constant ocean current, this current and the energy in it can be used to drive underwater turbines, giving continual generation. The tapping off of the energy from the current can also be used to slow it down and it doing so deflects them from natural course in a controllable manner. This method is also itself be a way to engineer a controlled method to change the local weather and current energetics. For instance the ocean current turbines can be placed off the coast of North Carolina where the Gulf Stream deviates away from the east coast. By ensuring the current flows closer to the coast or away from it the local weather or long-term climate can be influenced. The Gulf Stream has nearly 90 GW of kinetic energy in the current and this is extending along 1800 km near the coast, extracting this kinetic energy and changing it's nature to modify the currents, humidity, air and water temperatures or winds is a powerful method possible.

Figure 4K:
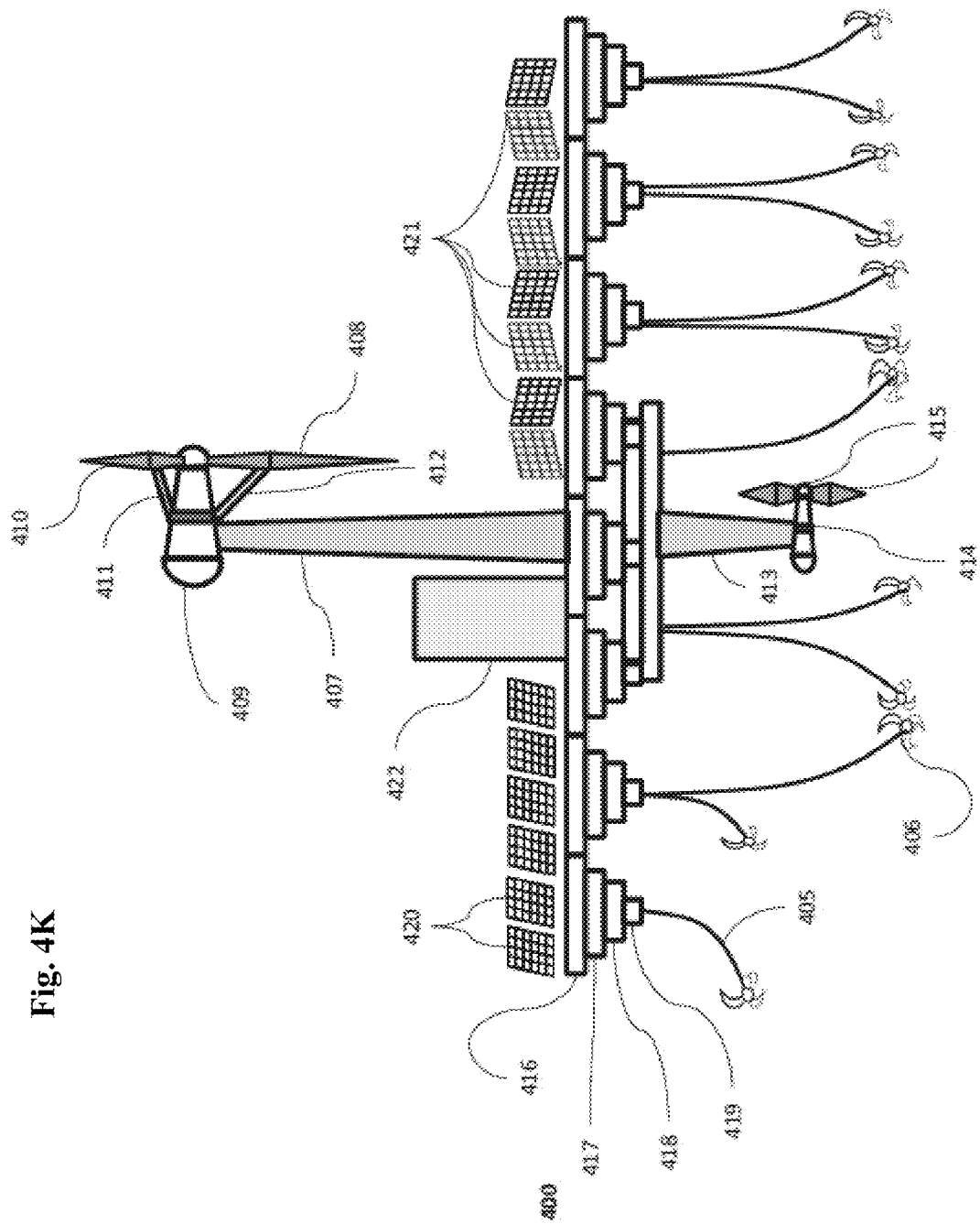

Embodiments of the invention mainly use renewable energy sources to drive machines, pumps and heat pumps. Electricity is generated using wind turbines, solar panels and/or ocean current turbines. The wind turbines and solar power systems are built on floating pontoons structures, rigs or manmade islands, by combining the counteracting mechanical requirements of solar and wind structures for overall balance and cost optimization. One embodiment of the structure for the ocean based control station 400 is shown in FIG. 4.A, this elevation or front face drawing, shows a large platform 401, ranging in sizes between 50 to 200 meters on each side, this rigid platform can be made using metals, wood, composite material like fiber and nanoparticle embedded matrices that are engineered or suitably coated for marine environment. Platform 401 is itself mounted on a floating rigid structure 402 which can made using solid frame suitable for marine environment with large hollow sections to provide buoyancy, these floating platform sits on hollow substructure that consist of a plurality of either separated submerged large floating sub-structures 403, or have multiple submerged floating chamber sections 404. The combination of solid, floating sections and chambers are fastened to the floor using plurality of cables 405, these cables could be consisting of twined metal ropes suitable for marine submersion and may consist of reinforced fiber or nanoparticle cables. The cables 405 are directly fastened to solid floor columns, piles or anchor structures 406. The floating platform 401, is rigid and structurally stable to accommodate a windmill tower 407, on top of which the stator and nacelle of windmill 409 is sitting that accommodates the rotor shaft which has plurality of the rotor blades 408 and also shown as 410. The tower 407 can be ranging in height from 10 meters to 200 meters as required for the system design and depending on the length of the rotor blades 408. In conventional design the windmill tower experiences the wind forces acting on the top of the tower and this force creates torque to topple the tower, this torque is counteracted by rigid support at the bottom of the tower, which is typically done with solid connection and ballasting into ground structure. In the control station designed for oceans, direct solid ground structures are deep on ocean floor which are connected using submerged pedestal structures that can be economically viable when the depths range from tens of meters to perhaps hundreds of meters deep. The structure shown in 400 consists of floating platform 401, 402 and hollow floating structures and submerged structures 403 and 404, rigidly connected to the tower 407. When the tower 407 is tipped due to the action of forces of wind, the weight of the nacelle and rotor also acts to further tip the system and can topple it over to lay down flat horizontally, in the floating deep ocean design shown the tipping of tower 407 leads to lifting of the structures 401, 402, 403 and 404 and pulling on the cables 405 and anchors 406. Thus the weight of these structures acts as in a ballast to counter the torques and forces from wind and gravity. The weight of the floating system cannot be too high in order to ensure floatation, the torque required to prevent tipping over is assured by using large enough dimension of the platforms, the platform can be sized to be between tens to hundreds of meter on a side, to counter the torque of winds and gravity of windmill tower which itself ranges between tens to hundred meters in length.

One embodiment of the windmill is shown in FIG. 4.B.a as a side view of the control station structure, showing the floating structure elements 401, 402, 403, 404, cables 405, and anchors 406, tower 407 with windmill consisting of 408, 409 and 410. Here the windmill design is shown in elevation in FIG. 4.B.b, with a large cross-section area defined by the rotor lengths collecting wind energy and denoted as 4101. The windmill is designed for survival in high winds that can be expected to occur frequently in open oceans and during storms, the high wind speed blade design includes additional blade support rods, purlins or beams 411 and 412 that connect to the rotor blades 408 and 410 to buttress and strengthen it during high windstorms. These buttressing rods, purlins or beams also enable the blades 408 and 410 to be stowed in high winds exceeding some pre-determined threshold, as shown in FIG. 4.B.c. The stowing away or folding over of the blades 408 and 401 is done to reduce the radius effective collection area of the blades shown in FIG. 4.B.b as smaller area 4102. By reducing the collection area from 4101 to 4102, this design reduces the nature and magnitude of forces acting on the top of structure, reducing the forces and torques which could lead to tipping over of the mast, allowing reduction in costs and also increased reliability and lifespan to outlast multiple storm and high wind forces, a factor which is important for long lasting remote control stations.

In conventional design the windmill tower experiences the wind forces acting on the top of the tower and this force creates torque to topple the tower, this torque is counteracted by rigid support at the bottom of the tower, which is typically done with solid connection and ballasting into ground structure. In the control station designed for oceans, direct solid ground structures are deep on ocean floor which are connected using submerged pedestal structures that can be economically viable when the depths range from tens of meters to perhaps hundreds of meters deep. In another embodiment shown in FIG. 4.C, as a side view of the control station structure for deep ocean, showing the floating structure elements 401, 402, 403, 404, cables 405, and anchors 406, tower 407 with windmill consisting of 408, 409 410, 411 and 412. In addition the station has ocean turbines mounted on ocean current mast 413, this keel mast 413 connects to the submerged ocean current turbine consisting of nacelle and stator 414 and rotors 415. The ocean current turbines extract energy from steady ocean currents seen across the globe near the western boundaries of ocean basins driven by wind and the oceanic Gyre motion due to earth's rotation. The ocean currents can steadily generate the required renewable energy in addition the tapping off of the energy from the current can also be used to slow it down and in doing so deflects them off their natural course. This method is also itself be a way to engineer a controlled method change the local weather and current energetics, as is the intended use of the control station.

In the embodiment shown in FIG. 4.C, the tipping and toppling over of the windmill tower 407 due to wind forces and also gravity acting on the windmill systems leads to the lifting and tilting upwards of the ocean current mast 413 to which it is rigidly joined, thus work has to be done against the gravity acting on 413. The windmill including mast tower 407, stator 409, rotors 408, 410, 411 and 412 is counterbalanced with the ocean turbine submerged with keel mast 413 that has mounted on it heavy ocean turbine machinery 414 and 415. The counterbalancing of the windmill tower 407 and 413 is beneficial in reducing the overturning torque due to wind, ocean gravity acting on 401, 402, 403, 404, 405 and 406 and reduces the forces on the foundation or the floating platforms, reducing cost for the required structural weight for floating platforms and also the rigidity strength of the connection between the masts 407 and 413 to the platforms 401, 402, 403 and 404. Thus combining windmill and ocean turbines on the same platform, leads to more predictable energy as the combination is taken from two separate sources, and also leads to reduction in overall cost of the floating generation structure due to reduced forces and amortization over larger amount of generation.

In another embodiment shown in FIG. 4.D the combination of windmill including mast tower 407, stator 409, rotors 408, 410, 411 and 412 is counterbalanced with the ocean turbine submerged with keel mast 413 that has mounted on it heavy ocean turbine machinery 414 and 415, with a modified structure for floating consisting of plurality of smaller platforms 416, resting on partially submerged floatation platforms 417, rigidly connected to submerged chambers 418 and 419. The plurality of platforms 416, are joined to each other to form an array, where the joints between the platforms 416 can be rigid or be chain links or cables that are allowing rotation or linear motion between the plurality of platforms 416. FIG. 4.D.a shows the isometric view of the arrangement showing an array of plurality of platforms 416 with masts 407 and 413 rigidly mounted to the array. The rigid joint masts 407 and 413 are connected to the floating array at platforms 416, 417, 418 and 419. The submerged sections 419 can be solid to ensure high rigidity and strength so as to connect to the masts and the cables 405 that ties to the bottom piers or anchors 406. The use of plurality of platforms and submerged sections and chambers allows for the reduction of overall cost and scalable manufacturing of the system components.

In another embodiment shown in FIG. 4.E the combination of windmill including mast tower 407, stator 409, rotors 408, 410, 411 and 412 is counterbalanced with the ocean turbine submerged with keel mast 413 that has mounted on it heavy ocean turbine machinery 414 and 415, with a modified structure for floating consisting of plurality of smaller platforms 416, resting on submerged floatation platforms 417, rigidly connected submerged chambers 418 and 419. FIG. 4.E.a shows the isometric view of the arrangement showing an array of plurality of platforms 416 with masts 407 and 413 rigidly mounted to the array. The plurality of platforms 416, are joined to each other to form an array, where the joints between the platforms 416 can be rigid or be chain links or cables that are allowing rotation or linear motion between the plurality of platforms 416. FIG. 4.E,b shows the plurality of platforms 416 are by the way of illustration, shown as 4161, 4162 and 4163, and which are jointed here allowing rotation motion using a Ball and socket joint consisting of sockets 423 and balls 424. The ball and socket joint permits the rotational motion of the platform 4161, 4162 and 4163 relative to each other as seen in FIG. 4.E.c, this is also possible using tying by cables or chain links. The relative rotation motion between platforms, allows the plurality of platforms 416 to conform to the ocean surface that may have an undulating nature driven by the waves, also the ocean surface can be rough due to heavy winds or other current driven phenomena. These undulations and relative height differences can be inducing large forces affecting the rigidity of the platforms of the types 401, 402, 403 and 404, and also on an array consisting of rigidly jointed platforms 4161, 4162 and 4163. The relative rotational motion is permitted using chains, cables or ball and socket joints. The advantage of ball and socket in comparison to simple cable or chain link jointing is that they permit only rotational motion between the platforms, and due to the semi-rigid nature of the joint there is less likelihood of pairs of platforms violently colliding with each other due to relative motion and thus eventually wearing down or breaking due to the repeated hits or force of impact.

In another embodiment shown in FIG. 4.F the combination of windmill including mast tower 407, stator 409, rotors 408, 410, 411 and 412 is counterbalanced with the ocean turbine submerged with keel mast 413 that has mounted on it heavy ocean turbine machinery 414 and 415, with a modified structure for floating consisting of plurality of smaller platforms 416, resting on submerged floatation platforms 417, rigidly connected submerged chambers 418 and 419 that are festooned using cables and chains 405 tied down to anchors 406. Here solar panels 420 and 421 are mounted on the rigid large platform 401, 402, 403 and 404 are used or as shown in the FIG. 4.F on top of plurality of platforms 416, 417, 418 and 419. The solar panels 420 are mounted tilted to the horizontal at angle roughly equal to the geographical latitude of the location, tilted to face North in the Southern hemisphere and South in the Northern hemisphere. This tilted arrangement is known to optimally generate solar energy over the course of a year. Alternatively the solar panels can be tilted to horizontal at some low angle ranging from 0 to 10 degrees but facing East and West shown as 421, this type of tilt is known to balance out the generation of solar energy during a regular day by having the East facing modules generate higher in the morning, and the West facing conversely higher in the evenings. A control station may have a mix of the solar panels 420 and 421 to ensure best energy availability. The solar panels generate electricity or heat using solar energy. Solar power generation is possible for all stations across the globe except near the Arctic and Antarctic regions, however solar energy generation is critical where winds are low, the so called Doldrums latitudes or Inter-tropical Convergence Zones where there is very little wind, running roughly 5 degrees North to 5 degrees South near the Equator. However, solar energy requires large areas for a one Mega-watt (1 MW) plant it requires around 4000 to 6000 square meters of area. This is possible in FIG. 4.F by covering with solar panels all available surfaces of station buildings and turbine towers, or with a floating array on platform of dimension ranging between 80 meters to 100 meter on each site (E-W and N-S). For larger capacities it will be necessary to use large fields of floating arrays, scaled proportionately, for a 10 MW solar power station the array dimensions increase to 200 to 300 meters on a side. With the array consisting of plurality of smaller platforms 416, this is possible by linking larger rows of such panels. If each platform 416 is of size 2 to 10 meters each, then the rows consist of between 20 to 100 such platforms. Also shown in FIG. 4.F is a container and storage area 422, for electrical storage in batteries, ultra capacitors or also additional electronic generation equipment. This is needed because the power generated by renewable sources is variable during the day and years and can also be erratic; so to use it, it is required to be conditioned and best used in conjunction with storage. In order to deal with the variability of renewable sources and ensure steady long-term supply of power, energy storage is key. Battery technology is improving rapidly, becoming denser, lighter and cheaper. Especially critical is large MW scale storage to ensure 24-hour operation smoothening out the vagaries of winds, tides and sunlight. The control stations would have to ensure sufficient storage capacity to last out few days of no energy source ensuring critical operation are supported. In another embodiment, the system is modified in design suitable for local use, such as having wind turbines or solar panel farm to cover ice on the Antarctic to shade the field from direct sunlight, thus preventing of melting due to the sunlight, while the energy generated is used to drive heat pumps to cool the warm waters below, or using seawater pumps to overturn warm waters away from ice. In some cases by using electricity generated from solar or ocean currents, wind turbines can also be driven in reverse to be used as a fan to generate wind as desired for local weather modification.

Embodiments of the invention may achieve a surface sea temperature (SST) is a key factor determining the local weather and in general short and long-term climatic conditions. The way to control SST and mixing of Oceans, which may assist to slow down the immediate temperature rise and climatic change. FIG. 5 shows the control station functional purpose to engineer interactions between Ocean and Atmosphere. The functional description 500, consists of Atmosphere 501 and Ocean 502, with the system to engineer controlled interactions 503. The parameters for Atmosphere consist of wind speed and height profiles 504, relative humidity and precipitation rates 505, and the temperature height profiles 506. The oceanic parameters are ocean currents with their depth profiles 517, salinity profile 518, vertical currents both upward and downward welling 519 and finally the temperatures 520 both the SST and the depth profile. The control stations engineer additional interactions 503, between the ocean and atmosphere including enhanced wind ocean coupling 507, energy transfer 508, and mass transfer 512. Naturally the transfer of motion and energy between wind and ocean is very inefficient due to the difference in viscosities of the two fluids and also smooth interface that exists most of the time, this coupling between the wind and ocean can be directly enhanced 507 by using windmills to drive the ocean currents or vice versa the additional wind or ocean energy can also be used to modify the other parameters as required. Energy transfer 508 can be in the forms of direct kinetic energy by enhancing motion 509, or driving turbulent churning 510 or simply in form of heat addition or removal 511. The mass transfer 512 between ocean and atmosphere can be enhanced and controlled by using various machines to force air through the ocean to create bubbles 513 which lead to better gas absorption by the ocean water, conversely water from ocean can be sprayed into the air increasing local evaporation 514 this can increase or change the humidity 515 on the surface which can get convected to other parts of atmosphere with vertical and horizontal winds. The bubbles 513 and spraying 514 can also be used to control the gas exchange of atmospheric gases such as Oxygen, Nitrogen and Carbon dioxide, impacting their local and large area concentrations to impact the atmospheric properties over the long term.

As shown in FIG. 6 the surface sea temperature is reduced by movement of heat away from the surface, and is done by using pumps either directly to move seawater where warm water is moved deeper into cold oceans or more likely colder deeper water is moved to the surface. The pumping system 600 is used to control the profiles of temperature and densities with depth as shown in 601 with temperature 610 and density 611, and salinity also which is not shown here. The seawater pumps are used for operation in ocean at varying depths for current modification with amplification where the inline pumps work laterally 602 increasing the flow in the direction of natural current, or inline pumps oppose the flow as in 603 attenuation of natural current or causing turbulence in shapes of eddies, or the lateral pumping acts horizontal giving sideward deflection of currents on the surface as shown in 604. Or the pumps are operating vertically forcing downward or sinking the water from surface 605. Similar to the surface pumps there are deeper water pumps designed for changing flow strength either inline 606, opposing 607, or lateral deflection 608, or vertically perpendicular 609. These pumps are placed at different depths to influence overall structural flow of thermoclines, haloclines and pycnoclines and can be used for vertically mix thermocline layers in ocean and then used to control the surface water temperature and salinity. Each pump set can be designed for changing flow strength to be either inline, opposing, or perpendicular as required dynamically. The pumps can also be mobile so as to move to areas of interest and can also be spatially separated out far from generation location, to increase the area of influence of the control station on the surrounding ocean.

A simple apparatus to move heat down into ocean depths would be a passive heat exchanger designed to take heat from the surface of the ocean into lower depths based solely on thermodynamics and heat flow. This could consist of heat exchanger tube mesh or net near the top 10 m of surface and a solid rod or piped connection to another heat exchanger mesh at depths around 1000 meters. These two meshes would be connected via metallic cylinders or tubes that conduct heat from the hotter surface down to the colder realms of lower depths. The heat exchanger would conduct the heat from surface to the lower depths and reduce the temperature on surface by doing so. Calculations are shown here for 1 square kilometer of Open ocean area. Taking the case of the transfer of heat from ocean surface down to depths of 1000 m where the temperatures are lesser than 5° C. The radiation incident on equatorial surface is 1000 W/sq-m during daylight but averages to around 340 W/sq-m over the globe (or in 24 hours at a location). For one square kilometer this translates to 340 MW of incident radiation, we now assume that roughly 10% of it is absorbed by Ocean surface. That means we have to move away roughly 34 MW of heat away from the surface to avoid heating. If we were to design mesh heat exchangers at the top and bottom, and used thermal conduction to connect them across 1000 m depth, the required cross-sectional area for Copper tubing would be 4.5 sq-km, that is 4.5 times the total area available. If we used Monel, an alloy that will avoid corrosion in the seawater, the required area is 65 sq km! Clearly the simple metal tubing connected heat exchanger will not even work for conducting 10% of the incident heat. Conversely assuming even the unrealistic design of using the full square-kilometer of area we can theoretically only conduct perhaps 2% of the heat with Copper and only 0.15% with Monel.

Another method shown in FIG. 7 would to be use closed cycle heat pumps that move a thermic fluid to carry the heat; the thermic process transports high heat capacity so a smaller volume has to be pumped around. Heat pumps are preferred because of their energy efficiency to move the heat from the surface to deeper ocean or away from melting arctic ice or to counter the heating of coral reef surface. The heat pump 700 shown in FIG. 7 consists of the surface heat exchanger tube network 701, which absorbs energy from the surface seawater reducing the surface sea temperature, this heat is used to evaporate a thermic fluid which is being pumped out through a pressure control valve 702 by a vacuum pump 703. The low pressure pump 703 is sucking out the thermic fluid from the heat exchanger 701 and causing fluid evaporation and removal of heat of evaporation from surface and thus moving the heat down through insulated piping 704 from where it is moved to the lower depths of the ocean using second stage pumping 705, that extracts the fluid and compresses it to higher pressure through the one way valve 706. The compressed thermic liquid condenses in the exchanger tube mesh 707 releasing its heat of condensation in the desired colder ocean depths, from where the liquefied thermic fluid is pulled out by deep-water pumps 708 which pumps it to the top surface but use hollow insulated pipes 704 and 709 (or use metal lined concrete to reduce cost) that allow a thermic fluid to be piped from surface to the desired depths. It is this thermic fluid that moves the heat from surface collecting heat at one end, and transporting and releasing it at the other end, as is done in a refrigerator or heat pump. In this case, the heat exchanger on surface 701, which is the hot end of the pipe, will be used as an evaporator absorbing the heat as latent heat of evaporation of the fluid. This hot fluid is pumped down where it is compressed and condenses releasing the heat to the deeper waters via another exchanger 709. Valves 702 and 706 ensure one way flows, while pumps 703, 705 are creating low pressure vacuum ensuring evaporation of fluid, while liquid pumps 708 and 712 control the flow in liquid form. Pumps 705 and 708 are specially designed so they can be placed in deep ocean waters, while pumps 703 and 712 are placed near the surface of the ocean. Insulated pipes 704 and 709 allow unimpeded fluid flow. The liquid flow control valve 710 along with reservoir 711 allows continual flow. The amount of fluid to be pumped is determined by the total heat to be transported divided by the latent heat of evaporation. One embodiment uses water as the fluid, mainly because of safety in case of leakage also it has very high latent heat of vaporization that is roughly 2440 kJ/kg. The relevant properties of water for the temperature range are given below

| Water Saturation properties at temperature | | | | | | |
|---|---|---|---|---|---|---|
| Temperature | | | | | | |
| | ° C. | 25 | 10 | 5 | 2 | ° C. |
| Saturation pressure | bar a | 0.032 | 0.0123 | 0.0087 | 0.0071 | bar a |
| Sat pressure Pascal | 101.325 kPa | 3211.7 | 1244.5 | 884.1 | 715.3 | 101.325 kPa |
| Liquid | | | | | | |
| Enthalpy | kJ/kg | 104.8 | 42.0 | 21.0 | 8.4 | kJ/kg |
| Density | kg/m3 | 997.0 | 999.7 | 999.9 | 999.9 | kg/m3 |
| Volume for 1 kg | m3 | 0.0010 | 0.0010 | 0.0010 | 0.0010 | m3 |
| Entropy | kJ/kgK | 0.37 | 0.15 | 0.08 | 0.03 | kJ/kgK |
| Vapour | | | | | | |
| Vapour enthalpy | kJ/kg | 2546.5 | 2519.2 | 2510.1 | 2504.6 | kJ/kg |
| Vapour density | kg/m3 | 0.0231 | 0.0094 | 0.0068 | 0.0056 | kg/m3 |
| Volume for 1 kg | m3 | 43.34 | 106.31 | 147.02 | 179.76 | m3 |
| Vapour Entropy | kJ/kgK | 8.56 | 8.90 | 9.02 | 9.10 | kJ/kgK |
| Energy | | | | | | |
| d(PV) Gas Pumping Energy | 1000 Pa-m3 = kJ/kg | 139.2 | 132.3 | 130.0 | 128.6 | kPa-m3 = kJ/kg |
| Evaporation energy | kJ/kg | 2441.7 | 2477.2 | 2489.1 | 2496.2 | kJ/kg | through insulated pipes 709 with flow control valve 710, extra thermic liquid is stored in reservoir 711, from where it is pumped using surface pumps 712 expanding the fluid volume into the heat exchanger tube mesh 701 where the low pressure leads to the evaporation of the liquid into gas and completing the closed loop for the thermic fluid.

Thus the apparatus 700 shown in FIG. 7 is used which consists of a large area mesh of tubes conducting the surface thermic fluid, using this fluid the heat from surrounding sea water is transferred through the thermally conducting tube walls into the thermic fluid carried inside the tubes. This is extending the concept of heat pipe or a closed loop heat engine cycle. Here we use the mesh 701 and 707 at the different depths for exchanging heat with surrounding water, In order to be able to conduct the 34 MW of heat given the latent heat of vaporization as 2440 kJ/kg, we need to evaporate water at the rate of ~13.9 kg/s. The required water flow at 25° C. is about 15 liters/s or 911 standard liters per minute. For the water to boil at 25° C., it has to be under vacuum of lesser than 3000 Pascals, which is achieved by using vacuum pump 703 that moves the vapors towards the cold end through pipes 704, using second stage pump 705 which pushes the fluid through one way valve 706, the where the vapors are compressed and condensed back into liquid at temperatures lesser than 5° C. The evaporation-condensation cycle is done in a closed loop system like shown in FIG. 7. The evaporator is near the surface at temperatures greater than 20° C., while the condenser is deeper down in the ocean with temperatures below 5° C. The corresponding volume of the steam is 43000 times bigger at 25 C so it is 603 cu-m/s or 36 million standard liters per minutes! If the steam is moving at speeds around 10 meters per second this requires cross section area of 60 square meters, but that area can be as low as 15 square meters if the steam speed is increased to 40 m/s. To have this cross-sectional area requires a diameter of 4.4 m at 25 C and this diameter increases to requirement of 8 m diameter at the bottom near the compressor where temperatures are close to 5° C. We now estimate some of the key components of work done to move the fluid in the closed cycle. The first component of the required work to be done, is the work done by a vacuum pump to remove the vapor out from evaporator, where in case of an ideal scenario the work done is given by thermodynamic calculation of d(PV)/dt. In this case with calculated energy of 130 to 140 kJ/kg for the 14 kg/s water flow the work required is on the order of 2 MW, accounting for frictional losses and taking realistically achievable efficiencies we assume that required work could be as high as 5 to 6 MW. The Second component of work, accounts for pressure loss due to finite conductance of the pipes, that is given roughly $C=(\pi d^3)/(128\eta /)$ where Conductance $C=Q/(\Delta P)=Q/(P_2-P_1)$. To keep this pressure drop low, which will affect the work done by pump and compressor it is important to increase the diameter of the pipes. This is a trade-off between material used for making the pipes broader or the work to be done for pumping. For now we estimate this extra work to be doubling the amount of power needed, so we estimate the needed power to be 10 MW! Finally, there is additional work done in compressing the vapors to liquid and then to move the liquid water back to the surface for evaporation under vacuum. The work required to move the 1 liter/s of water by about 1000 meters is roughly 10 kW, therefore to move 15 liters/second, requires only 150 kW of power. Therefore for one square kilometer of surface area and remove 34 MW of heat on average, with realistic efficiencies, we estimate need for 10 MW of power for pumping the fluid in the closed cycle system extending over 1000 m depth. In summary using a heat pipe like engine and efficient heat exchanger to remove 34 MW heat from surface for affecting a 1° C. change, we have to pump about 15 liter/second of water and expend about 10 MW of power to do that. The Coefficient Of Performance (COP) is therefore in the range of 3 to 4. This is far more efficient than direct pumping of water to cool by 1° C., that requires 57 TW of power, the heat pump methodology gives an improvement of over a factor of over 1000!

As shown in FIG. 8, a global network of sensor arrays 800 is used to measure and collect data over large area of properties such as wind speeds & direction temperature, salinity, current flow directions and measuring these parameters extending the information in vertical directions to get height & depth profiles, key parameters will be collected both for Oceans 802 and Atmosphere 801. Currently there are some systems in operation such as those using bathymetric cruises, or drifter buoys that transmit information out to Argos satellite, that data is collated and analyzed by many governmental agencies such as NOAA, however since these drift around the globe the data is never from the same location. These systems established and deployed so far have tended to be sparse in terms of density or total numbers and temporary both in terms of being stationed at a location for long or survival of a node for long periods. In order to be able to model, predict and control weather, a large volume of data with long historical trends and systematic analysis is required. This requires thousands of nodes with sensors that are consistently designed and programmed to collect coordinated vital information. In one embodiment fixed nodes 800 are sited on platforms or man-made islands in open sea to collect data for Atmosphere 801 and Oceans 802 that have a cluster of sensors 804 for atmosphere and 807 for Oceans, these clusters are designed to be resilient and with built in redundancies 805 and 808, to ensure continual valid data. The sensors are designed to collect multiple data to give height profile 803 for the air parameters and depth profile 806 for the waters. Additionally the control stations 300 have tools with communication systems 314, linked together to transmit and receive information. Each control stations monitors velocity 820 of atmosphere and ocean water, ocean currents are measured using hydrophones 821 and special clusters to characterize eddies 822 separating out translational velocity from the eddy rotational components. Atmospheric pressure 809 is measured using plurality of barometers 812, temperature of atmosphere 810 is measured using plurality of thermometers 813, similarly temperatures of ocean 817 is measured with submerged thermometers 818. Station also measures the humidity 811 at heights using hygrometers 814, and salinity 815 at different depths using ionic concentration measurement tools 816. Chemical analysis will measure the Gas concentrations 819. All these parameters as a function of temperature and pressure will be collected on the surface and at various predetermined depths and heights. The system will have multiple clusters of thermometers, anemometers, salinity measurements, hygrometers, hydrophones and ocean current measurement sensors which are festooned and hanging via cables to collect information from different depths and transmitting via a satellite communication 315, mesh network 316, and cables 317 for coordinated collection and collation for real time offline analysis using onboard system 318, 319 and 320. The sensor nodes with automated calibration and operational modes, communicate with base stations or between the various stations in a mesh using wireless or wired network 316. The collected data is collated at the edge using computers and storage 318 and 319 and at centers of network to allow local data validation and crosschecking then is stored in specialized distributed database.

In another embodiment, regular information is processed from the Control sensors. This is shown in FIG. 9 as information processing system 900, which has the Sensor system 901, Data collection 902 and Information processing 903. Sensors 901 have built in testing routines 904 to ensure correct operation of sensor systems, and ensure self-calibration 905 of sensor ensuring correctness of the data. Any failure of test routines may bring in use of backup systems as the design necessarily uses redundant 906 sub-systems and by doing so it ensures resilient operation 907 that means long term operation with minimal maintenance requirements. The data collected 902 is then processed as a high frequency time series 908, which is then processed to identify signals for specific events 909, and this is ensured with appropriate statistical validation 910 of the occurrence of signals. Data sanitization is performed in the local regions with cross checking across clusters on a control station 911 and across control stations 912, the data is then collated across the network 913 and indexing and labeling and data synthesis performed to provide 4D (space+time) GIS for variables of interest along with their key statistics. Physics based time series evolution models are extracted and the key parameters also shared to ensure correctness and validity of the signals.

In a further embodiment, the array of control stations are spread across the globe and the functioning of their machines and pumps coordinated across long distances. By using an array of large number of pumps or devices the system can affect large areas while each device distributed in the array is impacting practical size of power (5 to 20 MW) or area (one to ten square kilometer), as shown in FIG. 10 as a table 1000 with columns 1001 to 1013 and rows 1014 to 1021. Each element or cell in the array breaks down the problem of control to its local region of influence, which interacts with the neighbouring cells that may coordinate with it to amplify or nullify the impact as desired. Cells are identified here as (Row, Column) as illustrated (1014, 1001) and (1015, 1002) both of which have "X" entry are both increasing a parameter for instance the ocean current, while cell (1014, 1003) with entry "O", opposes the flow. The white area in the array has mostly entries "X" while the gray area has entries of "O". By coordinating multiple cells the gray areas can oppose and shut down a flow while white area can increase flow in the channel to increase the localization. With such coordination the overall impact can be much bigger impact and longer term. Thus the magnitude and direction of work of each cell is coordinated by control of each station in the array to modify the ensemble as a whole. Similarly the long-term trend is impacted and controlled by sequence of designed temporal perturbations In yet another embodiment, the global placement of the machines in the array on the open seas is designed, so as to be most efficacious and this is done by using gridding patterns, densities and algorithms as developed in numerical computing FIG. 11. The series of monitoring nodes will be strung together in a network for monitoring the oceans, as an example in the South Pacific, the physical layout of network can be as simple as a rectangular array arrangement covering wide swathes of coastline and open oceans as shown in FIG. 11. This array of data-points can be combined in sophisticated GIS models to make a complete descriptive model of the ocean, with 3D data set available now, significantly refined over the current state with higher resolution and more types of data compilation and real time computation.

In another embodiment since the interest is to collect relevant data especially in areas where fast changes are a-priori known to occur, the grid design can be denser near these locations, much like triangular grid designs used in setting up 3-D computer numerical solutions, wherein the grid get optimized to extract maximal information. FIG. 12.a shows a representation of ocean currents across the globe, to be more effective the placement of grid points would be to capture more information with denser grid points in areas where the most changes in currents are visible on the plot. Here much denser grid will be off most of the coastlines. This approach for placement of the arrays is to leverage crucial geographical areas, typically boundaries between sea and land, which naturally have big impact on weather and climate, for instance the ocean currents such as Gulf Stream, Kuriosho and others such as the wind driven convergence currents impacting El Nino. The arrays are placed to specifically target and modifying these flows i.e. strengthening, weakening or deflecting the flows and in doing so these flows are used to amplify the work done by machines in the array FIG. 12.a. The densest portions will be near East Coast of USA, NE coast of Brazil, North Sea, Japanese East cost, near the fast moving Guinea currents, Australian East and South Coast etc. Essentially more grids will along the coasts with noted fast moving currents next to them. The areas of open oceans have less fast moving changes and thus can work well with sparser gridding & less density of control stations.

In another embodiment in addition to control stations arranged as per FIG. 12.a they can be arrayed to address areas of cyclogenesis of storms such as Hurricane/Typhoon. Critical placement of control stations arrays is where the storm paths tend to converge and concentrate, as shown in FIG. 12.b, especially where they build up in the subtropics, such as near the Tenerife Islands marked as 1201, Caribbean 1202, Florida 1203, and Gulf of Mexico 1204, and other areas around the globe such as Hawaii, Philippines, Taiwan, Malaysia, Korea, and Andaman Islands in Bay of Bengal.

Figure 13B:
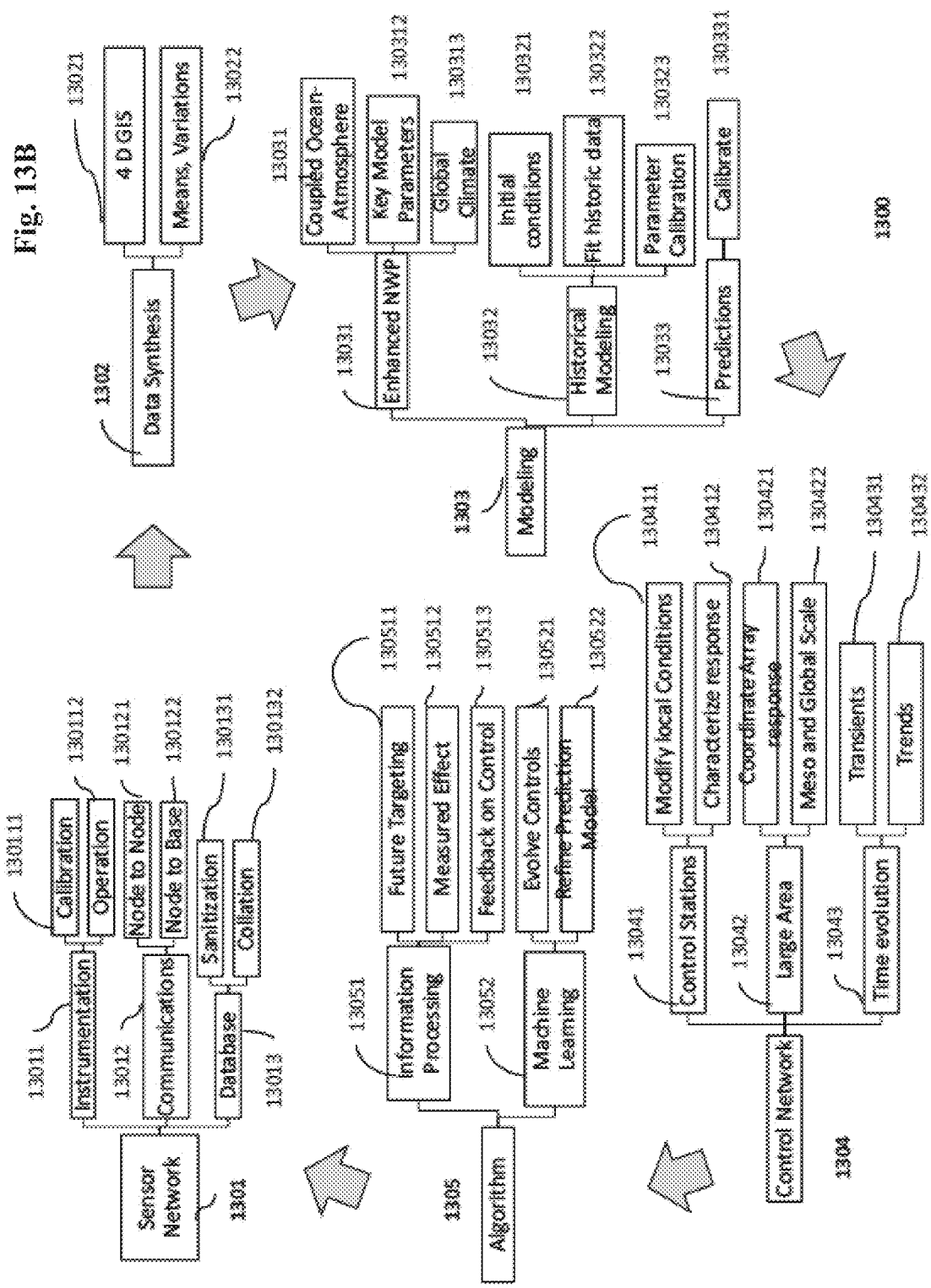

In another embodiment shown in FIG. 13.a, the overall data system 1300, consists of the monitoring network that provides invaluable data logging information about the state of the ocean 1301, this raw data is synthesized 1302 to extract maximal information about history and expected future behavior, enhanced modeling 1303 is then used allowing prediction of expected future behavior. These numerical model simulations use the data collection of wind, surface temperature over large areas to refine numerical weather prediction. These simulation models are then calibrated against historical and episodic data, and refined based on the derived fits. The prediction algorithms 1304 are then used with designed engineered forcing perturbations deployed through the array of control stations 1305. Experimental data from the array is collected 1301, and the information fed forward, including the step of synthesizing the results of predictions that are compared to the experimental observations resulting from the forced perturbations, thus completing the information feedback loop for further refining the algorithms. As shown in FIG. 13.b, the data logging using sensor Network 1301, which have required instrumentations 13011 with calibration 130111 and operation 130112 resilience, these sensors communicate 13012 between nodes 130121 (control stations) and node to base 130122 at central location, the database 13013 local to the control station consists of routines to sanitize the data 130131 and collate the information 130132. The data then goes through a data synthesis process 1302, where 4D-GIS data 13021 is organized and the key statistics 13022 are processed. Data synthesis 1302 is very important so as to quickly and efficiently extract vital information.

For instance the large amount of raw data collected is processed and synthesized into a useable form of four dimensional geospatial Information System (4D GIS) showing evolution with time of global variables of interest.

For this to be meaningful key summary statistics are computed and available enabling easy visualization and analysis. The synthesized data is input to the Modeling 1303, which uses enhanced Numerical Weather Prediction 13031 including couple Ocean-Atmosphere global 130311 modeling with the key model parameters extracted 130312 from past epochs and Global climate 130313 predicted.

Modeling of the system and the behavior of the Global climate is the heart of this system, which is based on enhanced Numerical Weather Prediction (NWP). NWP captures state of art models of Global climate and weather systems with sophisticated physical models for interaction between Ocean and Atmosphere via parameters such as wind velocity, humidity, pressure, ocean and atmosphere coupling etc. The models are parameterized with coefficients such as energy interaction terms that can be varied to fit the observed physical phenomena. One embodiment consists of improving Numerical Weather Prediction by sharing extensive fine-grained data from all the stations, that is combined in a hierarchical fashion using local data and its time evolution and summing it for wider area of model. There are a number of global climate modeling and prediction tools in use today, in one aspect of this invention, these NWP models are enhanced incorporating in to the system the concept of an array of control station designed to change local parameters so to controllably changer or engineer perturbation and forcing at the nodes and using the array, much larger areas. The NWP is used to reanalyze historical data 13032 with initial conditions input from past information 130321 and predictions of model are compared to actual evolution of the weather 130322, this process allows the calibration of the key parameters used in NWP 130323. Thus, the numerical modeling simulations use the data collection of wind, surface temperature over large areas to refine numerical weather prediction. These simulation models are then calibrated against historical and episodic data, and refined based on the derived fits. The modeling then is used to provide predictions 13033, which are calibrated with information at hand 130331. Since, Numerical Weather Prediction (NWP) is error prone due to importance of small errors accumulating during predictive simulations, as a result 4 Dimensional variation analyses are used in conjunction with ensemble simulations with adaptive observations to check on evolution of the most likely scenarios. The dense grid proposed here will enable better predictions and observations further improving the predictions. These predictions however still depend on the unfolding of natural processes, which are chaotic, and can vary the results significantly depending on interaction of multiple processes and factors. The predictions dictate the choice of forcing done using the Control Network 1304, that uses the Control Stations 13041 to modify local conditions 130411 and characterize the response 130412 in real time, this is done across a large area 13042 with coordinated network response 130421 to observe meso i.e. tens of kilometers and global scale changes 130422. The time evolution 13043 of the response is observed to separate the transient changes 130431 from the desired long-term trends 130432.

The prediction algorithms 1305 are then used with designed controlled perturbations deployed through the array of control stations. The algorithm contains information processing 13051 to ensure right set of targets are set for the future 130511, with the measurable impact quantified 130512 and feedback loop 130513 completed on the control stations with finer grained shorter term information to ensure actions are as desired. The impact of a control setting is characterized with historical and real-time learning and this is used to define the prediction system with Machine Learning so as to evolve the controls 130521 appropriately to induce the right amount of impact, also this learning is used to control and modify the prediction model 130522 itself using real settings on Control station and measuring the impact of physical control array settings. The results of predictions are then compared to the experimental observations that result from the forced perturbations in 1301, thus completing the information feedback loop for further refining the algorithms 1305.

FIG. 13.c shows another embodiment with interconnected learning cycle, Data Logging 1301 is important for the large volume of data, this data is synthesized 1302 information being fed-forward as a relationship denoted 1312, both 1301 and 1302 are used for Modeling 1303 these relationships are shown 1313 and 1323 respectively. The output from 1303 is fed via 1334 into control algorithms 1304, which engineers the forcing 1305 via modeled relationship 1345 and that produces a new set of data 1301 via function 1351. In addition there are relationships between the data logging 1301 and synthesis 1302, where the synthesized data or models may drive collection of additional data denoted as 1321, or in case of engineered forcing 1305 driving some additional data collection 1351. Data synthesis 1302, also accounts for the information from modeling and controller algorithms by relationships shown as 1332. The modeling is affected by Data 1313, Synthesis 1323, Algorithms 1343. The relationships for controller algorithm allow it to learn from Data 1314, Synthesized information 1324, Modeling 1334, and engineered forcing 1354. The forcing chosen 1305 are affected by data 1315, synthesized information 1325, modeling 1335, and algorithm 1345. The overall system has multiple feedback and feed-forward information subsystems allowing dynamic and speedy response, learning and modification of the characteristics.

One embodiment of the numerical weather simulation and prediction system is shown FIG. 14.a. As the data is collected from the array of control stations, those are spread over a large area and globally have a large number of distributed control and logging stations, the modeling use an algorithm of distributed data collection that interact with each using dedicated computing resources and modeling is centered around each control station, shown as an array of plurality of cells with some examples cells marked as 1418, 1419, 1420, 1421, 1422, 1423 and 1424. The data used consists of data from atmosphere collected using satellites and radars 1401, along with balloons to collect height profile of parameters 1402, combined with surface 1403 and Ocean depth data 1404, consolidated as a complete set 1405 which is available at a particular time t0. This rich dataset is tracked and its natural change with time collected 1406 as actual weather evolution, to finally arrive at a similarly detailed consolidated dataset 1407 at time t1. The dataset 1405 is mapped into a numerical weather cell 1408 which is then simulated using physical model of ocean and atmosphere interaction within the cell and exchanging mass and energy with plurality of cells either adjoining or at an influence distance away in both in spatial distance and in time. The numerical modeling is used to simulate and predict 1411 the evolution to give simulated cell 1412. The simulated cell 1412 is compared the actual data set 1407, at time t1, the difference in simulation to observation is then used to refine the NWP models 1414, in another aspect the dynamic algorithms will evolve using distributed machine learning and deep learning methods 1410 to predict the future state and similarly the comparison of state predicted at time t1 1412 to actual data at t1 1407 is then used to refine the predictive capabilities. The system then partially resets to start the loop again at t1 beginning with the dataset at t1 1407 used to define the cell state t1 1417 and predict state at t2 and so on and so forth.

In another embodiment, shown in FIG. 14.b. the consolidated data 1425 at time t0 is modified by using the engineered perturbation 1426, leading to immediate effect 1427, which naturally settles and evolves to state 1436 at time t1 with consolidated data. The impact of perturbation 1426 is modeled 1431 to give the perturbation 1429 and modeled state 1430, the prediction is done using 1432 a ocean & atmosphere coupled model based on physics and with appropriate numerical methodology and 1433 a composite artificial intelligence and machine learning model. The impact of engineered perturbations 1429 and time evolution is modeled 1431 to give simulated state 1438 at time t1. The difference 1437 between simulated state 1438 and consolidated data at t1 1436 is used to refine the models 1433 and 1432. The distributed algorithms simulate, predict, coordinate and control response across the array over larger distance and longer times that are engineered to guide the weather and climate to a desired state.

In another embodiment shown in FIG. 15, heat pumps are used to cool off the surface water temperatures of tropical corral reefs and thus controlling the temperature and acidity to ensure survival of the reef. The figure shows deep ocean water 1501 to the East (right side of figure) of reef lagoon 1502, with relatively deeper coastal water 1503 that separates the reef from the coast. The actual reef consists of many small clusters 1504 or larger one 1505, with lagoon boundaries defined by barrier reef 1507 or fringing reefs 1506, the prevailing ocean current 1508 is shown coming from North-West (the exemplar reef being shown is in the southern hemisphere, so equatorial warm waters come from North). For the specific reef the renewable energy control station specifically the solar array can be placed near the North West end of the reef, shown as platform with solar panels 416 with windmill tower 407 and ocean current keel mast 413, the location is optimal in so far as that is the direction from where the warm currents are flowing in from. Thus by cooling the incoming water, the temperature control can be more effective! The reef control station uses solar and wind energy to pump heat away from the coral reef and shoals into the deeper ocean cold water. FIG. 15 shows the design details for an exemplar reef, with the heat pump shown consists of the surface heat exchanger tube network 701, extending and connected underneath the solar panel array structure 1509, 701 absorbs energy from the surface seawater reducing the surface sea temperature, this heat is used to evaporate a thermic fluid which is being pumped out through a pressure control valve 702 by a vacuum pump 703. The low pressure pump 703 is sucking out the thermic fluid from the heat exchanger 701 and causing fluid evaporation and removal of heat of evaporation from surface and thus moving the heat down through insulated piping 704 from where it is moved to the open and deeper ocean area 1501, using second stage pumping 705, that extracts the fluid and compresses it to higher pressure through the one way valve 706. The compressed thermic liquid condenses in the exchanger tube mesh 707 with extension shown as 1501, where the thermic fluid in heat exchanger is releasing its heat of condensation in the desired colder ocean depths, from where the condensed thermic fluid is pulled out by deep-water pumps 708 which pumps it to the top surface through insulated pipes 709 with flow control valve 710, extra thermic liquid is stored in reservoir 711, from where it is pumped using surface pumps 712 expanding the fluid volume into the heat exchanger tube mesh 701 where the low pressure leads to the evaporation of the liquid into gas and completing the closed loop for the thermic fluid. The exemplar reef shown is roughly 0.5 sq. km shallow reef waters 1502 that are roughly 35 to 60 m in depth and the total area is 2 sq. km including lagoon up till fringing reefs. The coastal waters 1503 are between 100 to 200 m in depths, while for the deep ocean water 1501 depending on the proximity to the continental shelf the depth quickly falls off to over 1000 m in a distance of few kilometers. To remove the additional incident heat of 1 W/square-m from 2 square km, that means an average of 2 MW of additional heat has to be removed, i.e. 48 MWh of energy removal. The heat pump capacity to do this heat removal is chosen assuming a worst case Coefficient of Performance COP of roughly 2, the heat pump system will thus require it's driving power of to be roughly 1 MW i.e. it will require energy of roughly 24 MWh! Although realistically the heat engine cycle COP of 3 to 4 are possible and with optimal engineering the COP can be much higher closer to 5! Assuming only solar renewable energy is used to generate 24 MWh this requires installation of 5 MW solar capacities. If the power is taken only from solar array laid flat on the surface of ocean, the 5 MW will require about 35,000 square meters, which is about 1.67% of the total reef area. The shading of waters due to solar array also contributes positively to the overall goal of reducing the heating via the mechanism "Passive shading cooling". The impact of this covered area is to proportionately reduce the heating of the reef waters by roughly 1% reduction in collected energy which translates to average reduction by 0.6 W/sq-m, since only 20% of sunlight on solar panels is converted to electricity and the rest 80% of heat corresponding to 2.4 W/sq-m is still collected by the modules. Yet the shading of water is in itself towards the desired goal of cooling, using solar array therefore is beneficial in both passive and active manner, it can be argued that solar capacity of only 2 MW instead of full 5 MW, is required for cooling this coral reef. However, in case of non-solar renewable energy is derived from windmills then the full capacity of 2 MW would be required. The deep ocean is several kilometers (5 to 10 km) away, so instead of transporting the heat vertically directly into shallow waters the exchanger moves heat laterally to deeper areas and then releases the heat at lower depths. The work needed to move the vapor in the pipes is commensurately higher to overcome frictional losses, a total Renewable energy power of between 2 MW to 5 MW ought to be enough to allow cooling of the surface reef waters and thus enable protection of the coral from bleaching out due to high temperatures. With heat pump COP of 5 this requirement for renewable energy sources reduces to between 0.5 to 2 MW! As another example is of taking the coral reefs for the Bahamas, which have an area of roughly 2500 square km, the extra heat to be removed is roughly 2 GW to 5 GW and this will require renewable energy sources between 500 MW to 2 GW. Instead if the cooling were to be done by pumping and mixing colder seawater we would require 100 GW to 300 GW power to pump from deep ocean, which is higher by a factor of 50 to 100. For the global coral reef areas of roughly $3\times10^5$ square km ($3\times10^{11}$ sq. meters), this means removal of roughly 300 GW of heat, assuming the efficiency of this heat removal is similar to the example above, we require renewable energy sources of around 100 GW for heat pumping, compared to 1 to 3 TW with pumping of seawater if direct mixing of water was done. Using steam heat engine cycle is much more efficient than direct pumping and mixing of water, also note in all these cases the heat pump is moving heat from a hotter area to a cooler end, this is the direction of natural heat flow and also the engine cycle makes it much more efficient, pessimistically COP of 3 to 4 are possible, in reality with optimal engineering the COP can be much higher closer to 5 to 10!

FIG. 16 shows another embodiment where heat pumps are used to cool the waters lapping the underside of Arctic and Antarctic ice shelves. The melting of Arctic and Antarctic Ice is rapidly increasing mainly due to higher temperatures of the atmosphere and but significantly due to the warm circumpolar deep water with its temperature slowly increasing. The ice-shelf 1600 is sitting on top of the ground but a large amount of ice-shelf extends onto the ocean, which is buttressed by ice 1601. However the warm water 1603 lapping under the ice shelf is melting the buttress 1601, leading to calving or breaking off of the ice 1602. The continual melting and removal of buttress 1601 by calving process 1602, leads to the formation of unstable cliffs that continue to melt and fall at faster pace due to warm waters 1603.

Conventional heat pumps can be operated using renewable generated electricity, to move heat out from colder region to the hotter areas. These heat pumps can be used to cool the water lapping on the underside of Arctic ice, keeping that portion stable and offsetting any tendency to melt due to higher water temperatures. The embodiment shows the use of plurality of renewable energy based control stations 400, with wind turbines on towers 407, blades 408 and 410 and nacelle 409 with stator and motors. These turbines collect energy from wind to run heat pumps that are used to cool the water lapping the underside of the ice-shelf, the heat pump consists of the surface heat exchanger tube network 701, extending and connected underneath the solar panel array structure 1509, 701 absorbs energy from the surface seawater reducing the surface sea temperature, this heat is used to evaporate a thermic fluid which is being pumped out through a pressure control valve 702 by a vacuum pump 703. The low pressure pump 703 is sucking out the thermic fluid from the heat exchanger 701 and causing fluid evaporation and removal of heat of evaporation from surface and thus moving the heat down through insulated piping 704 from where it is moved to the open and deeper ocean area 1501, using second stage pumping 705, that extracts the fluid and compresses it to higher pressure through the one way valve 706. The compressed thermic liquid condenses in the exchanger tube mesh 707 with extension shown as 1501, where the thermic fluid in heat exchanger is releasing its heat of condensation in the desired colder ocean depths, from where the condensed thermic fluid is pulled out by deep-water pumps 708 which pumps it to the top surface through insulated pipes 709 with flow control valve 710, extra thermic liquid is stored in reservoir 711, from where it is pumped using surface pumps 712 expanding the fluid volume into the heat exchanger tube mesh 701 where the low pressure leads to the evaporation of the liquid into gas and completing the closed loop for the thermic fluid. The heat extracted would be pushed out into deeper colder water currents. The cooling of the waters can be done with single renewable energy stations of 10 MW generating roughly 50 MWh energy per day, which would allow on the order of 100 MWh i.e. 3600 Mega-Joules or more of heat to be removed, this would save roughly 10 Tons of buttressing ice every day. Although this number may looks small, but it important to recognize the benefit of avoiding this calving leads to slowing down of the crevassing and calving process, slowing down and avoiding the melting of perhaps tens times larger amount of ice being pushed into the sea. With appropriate engineering specific to the coastal area a number of coordinated stations can potentially stave off melting of critical ice-shelves. In addition, the total northward ocean heat transport due to Atlantic meridional overturning circulation is estimated to be 500 GW, not all of this makes it way to the Arctic, also only the recent extra amount has to be addressed, which is today roughly 0.3% increase on an average (1 W/sq increase in 340 W/sq). Thus, the additional ocean heat content to address is roughly 2 GW! Use of the heat pump methods allows this to be controlled with lesser than 1 GW of work done by an array of renewable stations.

In another embodiment of the invention, the renewable energy powered 200 control stations 300 and 400, to engineer the interaction between ocean and atmosphere 500, along with extensive sensor based collection of rich data using network 800 and distributed data processing 900 are arrayed together as in 1000, with a complete learning system 1300 using enhanced NWP (Numerical Weather prediction) 1400 with simulated forcing to define control steps, are used to control the global climate and weather as shown in FIG. 17. The arrays are placed at critical areas of the ocean where naturally occurring phenomena that are know to affect the global weather patterns, such as 1701, the tropical and sub-tropical South East Pacific region where the ocean SST is known to affect the global climate on a nearly annual basis through the phenomena known as El-Nino (warm SST in Pacific) or La-Nina (cooler SST in the region). Controlling the SST with a coordinated array 1701 allows leveraging small amount of energy to impact the global climate due to the complex interaction between atmospheric and ocean energy dynamics. For instance in 1701 in conjunction with another array on pacific coast 1706 can impact the Jet Stream position over North America to impact weather across the continent. Similarly 1701 interacting with 1708 can affect the weather pattern across Australia, while 1708 by itself can be used to cool the coral reef waters affecting the Great Barrier Reef. Similarly the interaction of 1701 and 1708 with Kurioshio current 1707 along coast of Japan will affect the East Asia Monsoon, while the control station array 1709 in Bay of Bengal will significantly affect the Indian Monsoon. In the Atlantic the use of control station array 1705 near the Tenerife Islands off the coast of Africa significantly affects the cyclogenesis of Hurricanes, while the Gulf Stream can be controlled using 1702 along the South East coast of USA, which along with 1703 along European coast can impact the weather there, along with 1704 in the Labrador and Greenland seas, affecting the Arctic Meridional overturning current and its impact on the Arctic seas.

The required size of these arrays can be estimated as follows, first we consider the Gulf Stream 1702 that flows along the East Coast of US, which transports near 30 Million cubic meters per second (30 sverdrups sv) near Florida Straits (and 150 sv near Newfoundland). Gulf Stream is typically 100 km wide with depths of 800 m to 1200 m and surface velocities lesser than 2.5 m/s, the average depth of the current consistent with the above data is therefore around 150 meters. To change temperature of one cubic meter by 1° C., requires 1.2 kWh, therefore to reduce the temperature of 30 Million Cubic meters by 1° C. requires 36 Million kWh, which is 36 GWh, since water is flowing at a rate of 30 sv, we require 130 TW of heat removal to reduce the surface temperatures by 1° C. Using a heat up will require between 30 to 60 TW of renewable energy power. Another approach is to pump the surface water down deeper and slow down the build up of the surface temperature. Recognizing that naturally the top layer thermocline ranges in depth from 50 m to 100 m, by pumping vertically this water the layer can be doubled and therefore the solar heating of the surface slowed by a significant factor of 2. The power required for this pumping this top 100 m is roughly 6 TW. However, since the effect of this pumping is to reduce the temperature build up over the season also since the impact need not be 1° C. as that is a large forcing, so the actual power can be even about 1 TW and still have significant impact on the overall temperature. For the El Nino regions 1701, the estimate of higher the normal temperatures is around 1 to 2° C. and the total warm water volume for the strongest El Nino years is approximately $2\times10^{14}$ cubic meters, so the total heat content is around $5\times10^{14}$ kWh, since this is accumulated over 3 to 4 years, this requires renewable energy sources of $10^{14}$ W or 100 TW. To move heat the down would require between 30 to 50 TW of renewable powered control stations. The El Nino process is of recharge-discharge and is centered on a build up of ocean heat in the tropical western Pacific in the cool phase, and then the heat is moved across the Pacific and then polewards within the ocean during the El Nino phase. This process involves lateral and vertical redistribution of heat within the basin involving the energy buildup, redistribution and distribution of the total heat. These processes can be modified with critically placed intervention even of few TW level can be effective to prevent the build up to the critical point and to slow down or attenuate the magnitude. One aspect can be ensuring stable trade winds to ensure build up of heat in still waters is avoided, or ensuring more effective transfer of motion from wind to the sea surface.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A system for controlling temperature of a body of water comprising:
    a protovoltaic cell receiving sunlight and being connected to an energy generation unit;
    a wind turbine, driven by received wind connected to the energy generation unit;
    a turbine connected to the energy generation unit;
    the energy generation unit being operable to receive energy from at least one of the photovoltaic cell, the wind turbine, and the turbine, and transfer energy and store said energy in an energy storage unit;
    a horizontal pump being positioned to create a current profile, the horizontal pump being connected to and drawing energy from the energy generation unit and the energy storage unit;
    a vertical pump operable to create a vertical flow of water and churn and distribute matter thereby moving warmer surface water to cooler depths, the vertical pump being connected to and drawing energy from the energy generation unit and the energy storage unit;
    a heat pump to transport thermal energy operable to obtain a desired temperature depth profile and a desired temperature distribution, the heat pump being connected to and drawing energy from the energy generation unit and the energy storage unit;
    an omosis unit operable to change salinity profile being connected to and drawing energy from the energy generation unit and the energy storage unit;
    a fan unit operable to change wind profile on surface of water being connected to and drawing energy from the energy generation unit and the energy storage unit; and
    a long infrared wavelength radiation device being connected to and drawing energy from the energy generation unit and the energy storage unit.

* * * * *